United States Patent
Buckley et al.

(10) Patent No.: US 11,250,810 B2
(45) Date of Patent: Feb. 15, 2022

(54) RENDERING IMAGES ON DISPLAYS

(71) Applicant: Facebook Technologies, LLC, Menlo Park, CA (US)

(72) Inventors: Edward Buckley, Redmond, WA (US); Gareth Valentine, Redmond, WA (US); Christophe Antoine Hurni, Seattle, WA (US); James Ronald Bonar, Redmond, WA (US)

(73) Assignee: Facebook Technologies, LLC., Menlo Park, CA (US)

( * ) Notice: Subject to any disclaimer, the term of this patent is extended or adjusted under 35 U.S.C. 154(b) by 0 days.

(21) Appl. No.: 16/891,908

(22) Filed: Jun. 3, 2020

(65) Prior Publication Data

US 2021/0383771 A1    Dec. 9, 2021

(51) Int. Cl.
*G09G 5/04* (2006.01)
*G06T 11/00* (2006.01)
*G09G 5/10* (2006.01)

(52) U.S. Cl.
CPC .............. *G09G 5/04* (2013.01); *G06T 11/001* (2013.01); *G09G 5/10* (2013.01); *G09G 2320/062* (2013.01); *G09G 2320/0666* (2013.01)

(58) Field of Classification Search
CPC .... G09G 5/04; G09G 5/10; G09G 2320/0666; G09G 2320/062; G06T 11/001
See application file for complete search history.

(56) References Cited

U.S. PATENT DOCUMENTS

2012/0044274 A1\* 2/2012 Lee ...................... G09G 3/3406
                                                        345/690
2015/0358504 A1\* 12/2015 Cai ...................... G09G 3/2003
                                                        358/3.05

(Continued)

FOREIGN PATENT DOCUMENTS

| CN | 104077987 A | 10/2014 |
|---|---|---|
| EP | 2009899 A1 | 12/2008 |
| EP | 2023602 A1 | 2/2009 |

OTHER PUBLICATIONS

International Search Report and Written Opinion for International Application No. PCT/US2021/031458, dated Aug. 6, 2021, 27 Pages.

*Primary Examiner* — Sahlu Okebato
(74) *Attorney, Agent, or Firm* — Baker Botts L.L.P.

(57) ABSTRACT

In one embodiment, a computing system may receive a target color and a propagated error for a pixel location. The system may determine an error-modified target color for the pixel location based on the received target color and the propagated error. The system may identify, based on a location of the error-modified target color in a three-dimensional color space, a subset of pre-determined colors in the three-dimensional color space. The error-modified target color may correspond to a weighted combination of the subset of pre-determined colors. The system may determine a pixel color for the pixel location based on the subset of pre-determined colors and respective weights associated with the subset of pre-determined colors. The system may determine, based on the pixel color, driving signals for light-emitting elements associated with the pixel location. The system may output the driving signals to control the light-emitting elements associated with the pixel location.

20 Claims, 16 Drawing Sheets

(56) References Cited

U.S. PATENT DOCUMENTS

2018/0254020 A1\* 9/2018 Buckley .............. G09G 3/2059
2020/0051483 A1   2/2020 Buckley
2020/0292824 A1\* 9/2020 Lee ................... G02B 26/0841
2021/0097943 A1\* 4/2021 Wyatt ................. G02F 1/1335

\* cited by examiner

RENDERING IMAGES ON DISPLAYS

TECHNICAL FIELD

This disclosure generally relates to artificial reality, such as virtual reality and augmented reality.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to systems and methods for rendering and displaying images on μLEDs-based displays. Unlike traditional LEDs-based displays, where each pixel emits in a narrow band of wavelength (e.g., red, blue, and green) which does not change much with current density, the display technology presented here may be based on color-shifting μLEDs (CS-μLEDs) pixels which may emit light with different colors according to the applied current. For example, the CS-μLEDs may comprise of III-N materials and related alloys and may be grown along a polar crystal growth direction. The alloy compositions, epitaxial layers, doping, and other parameters (e.g., number and thickness of quantum wells and barriers, growth orientations, growth conditions, etc.) may be optimized for certain color-shifting properties. In particular embodiments, the CS-μLEDs may be referred to as III-N LEDs, GaN LEDs, InGaN LEDs, etc. The CS-μLEDs may emit light with different colors ranging from red to green, and then to blue, following a color-shifting curve in chromaticity diagram when driven by signals with different current densities. In the meantime, the brightness of the emitted light may change proportionally to the applied current density. For displaying images of different colors, the system may use current to control the color and use PWM signals with particular settings to control brightness of the emitted light. The CS-μLEDs may operate in an ON/OFF mode without providing greyscales like the traditional RGB LEDs. The system may first select a number of primary colors that can be generated by CS-μLEDs using particular combinations of current densities and PWM setting parameters. For example, the system may select 10 primary colors that can be produced by CS-μLEDs. The 10 primary colors may include a black color corresponding to a state when CS-μLEDs are turned off, and 9 other primary colors (e.g., including red, green, and blue that are used as conventional primaries of the sRGB color space) selected along the color-shifting curve of CS-μLEDs in chromaticity diagram.

The system may combine two or more of these primary colors to produce a limited number of pre-determined colors which form a display color gamut. For example, when the display system includes three display panels, the system may configure CS-μLEDs of these three panels to generate three primary colors with particular luminance values to produce any color in the display color gamut. By selecting and combining three primary colors from the 10 pre-determined primary colors, the system could generate 130 colors with particular luminance values based on the 130 possible combinations of the primary colors. The luminance values of these 130 colors may be determined under a constraint condition which limits the sum of any selected three colors to be not brighter than a D65 white point. These 130 pre-determined colors may each correspond to a point in a three-dimensional color space defined on luminance and chromaticity coordinates. The 130 pre-determined colors may together form three-dimensional color gamut for the CS-μLEDs-based display. The 10 primary colors and their luminance values may be selected with constraint conditions that allow this three-dimensional color gamut defined by the 130 pre-determined colors to be tetrahedralized into a number of tetrahedrons having as uniform volume as possible in corresponding color spaces (e.g., L*a*b color space). Then, the system may tetrahedralize the display color gamut by determining a number of tetrahedrons, each having roughly the same volume, using the 130 points corresponding to the 130 pre-determined colors in the three-dimensional color space as the vertices of these tetrahedrons.

To display an image on a CS-μLEDs-based display, the system may map pixel colors defined in convention color spaces (e.g., a tristimulus color space, an sRGB color space) to the three-dimensional color gamut of the display as defined by the combinations of the pre-determined colors. In the meantime, the system may quantize the mapped colors to one of the available 130 colors by means of Floyd-Steinberg dithering. As an example, to display an image pixel at a pixel location (x, y), the system may first receive a target pixel color $I_{(x, y)}$ (e.g., defined in a tristimulus color space) and a propagated error $e_{(x, y)}$ for that pixel location (x, y). The propagated error $e_{(x, y)}$ may be determined using a Floyd-Steinberg dithering algorithm when processing the preceding pixel locations. Then, the system may determine the error-modified target color $u_{(x, y)}$ using $u_{(x, y)} = I_{(x, y)} + e_{(x, y)}$. The system may check if the error-modified target color $u_{(x, y)}$ falls within the convex hull of the three-dimensional color gamut. When the error-modified target color $u_{(x, y)}$ does fall within the convex hull of the three-dimensional color gamut, the system may determine an associated tetrahedron that includes or encloses the error-modified target color $u_{(x, y)}$. Then, the system may determine the barycentric weights of the error-modified target color $u_{(x, y)}$ with respect to the four vertices of the associated tetrahedron. After that, the system may select a vertex (from the four vertices of the associated tetrahedron) that is the closest to $u_{(x, y)}$ based on a determination that the vertex is associated with a maximum barycentric weight and use the color corresponding to that selected vertex as the dithered pixel color $I'_{(x, y)}$ (which is one of the 130 pre-determined colors) for the pixel location (x, y). Then, the system may determine three primary colors with particular luminance values that in combination could produce the dithered pixel color $I'_{(x, y)}$ and determine corresponding current densities and PWM setting parameters for the CS-μLEDs associated with the pixel location (x, y). The three primary colors, when produced by the associated CS-μLEDs may, in combination, produce the color $I'_{(x, y)}$ for the pixel location (x, y). After that, the system may calculate the error $e'_{(x, y)}$ of the current pixel color using $e'_{(x, y)} - u_{(x, y)} - I'_{(x, y)}$ and propagate the error $e'_{(x, y)}$ to other neighboring pixel locations using Floyd-Steinberg dithering.

When the error-modified color $u_{(x, y)}$ does not fall within the convex hull of the three-dimensional color gamut, the system may determine the associated tetrahedron by projecting the $u_{(x, y)}$ to the three-dimensional color gamut. For example, the system may first try to project $u_{(x, y)}$ along a first projection line which has a direction starting from $u_{(x, y)}$ pointing to a point on the luminance axis that has the same luminance value with $u_{(x, y)}$. When the first projection line intersects with the convex hull of the three-dimensional color gamut, the system may determine the associated tetrahedron based on the intersection point of the first projection line and the convex hull of the three-dimensional color gamut. In this scenario, the luminance value of the target pixel color $u_{(x, y)}$ may be preserved after being mapped into the three-dimensional color gamut based on the projection. When the projection line does not intersect with the convex hull of the three-dimensional color gamut, the system may project $u_{(x, y)}$ along a second projection line which has a direction starting from $u_{(x, y)}$ pointing to a point on the luminance axis corresponding to a center luminance value of the three-dimensional color gamut or pointing to a center point of the three-dimensional gamut. Then, the system may determine the associated tetrahedron based on the intersection point of the second projection line and the convex hull of the three-dimensional color gamut.

Using the same principle, images may be rendered and displayed on CS-μLEDs-based displays that include one or two display panels (instead of three panels). As an example, when the display system includes two display panels, the system may produce each pre-determined color of N number of pre-determined colors corresponding to the display color gamut by combining two primary colors generated by associated CS-μLEDs of two display panels. For example, the system may generate white color by combining red and cyan or yellow and blue. Assuming that the system selects 10 pre-determined primary colors for the CS-μLEDs of each panel, the system could generate 55 colors with certain luminance values based on the 55 possible combinations of the 10 pre-determined primary colors. These 55 pre-determined colors with particular luminance values may form a three-dimensional color gamut which can be tetrahedralized and can be used for determining the pixel color to be dithered. As another example, when the display system includes only one display panel, the system may instruct the display panel to work in a field sequential mode with a frame rate which could be three times faster than the conventional frame rate used by the CS-μLEDs-based display including three display panels. The display system may display three primary colors with particular luminance values sequentially in time and produce the target colors corresponding to the combination of these three sequentially displayed primary colors.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
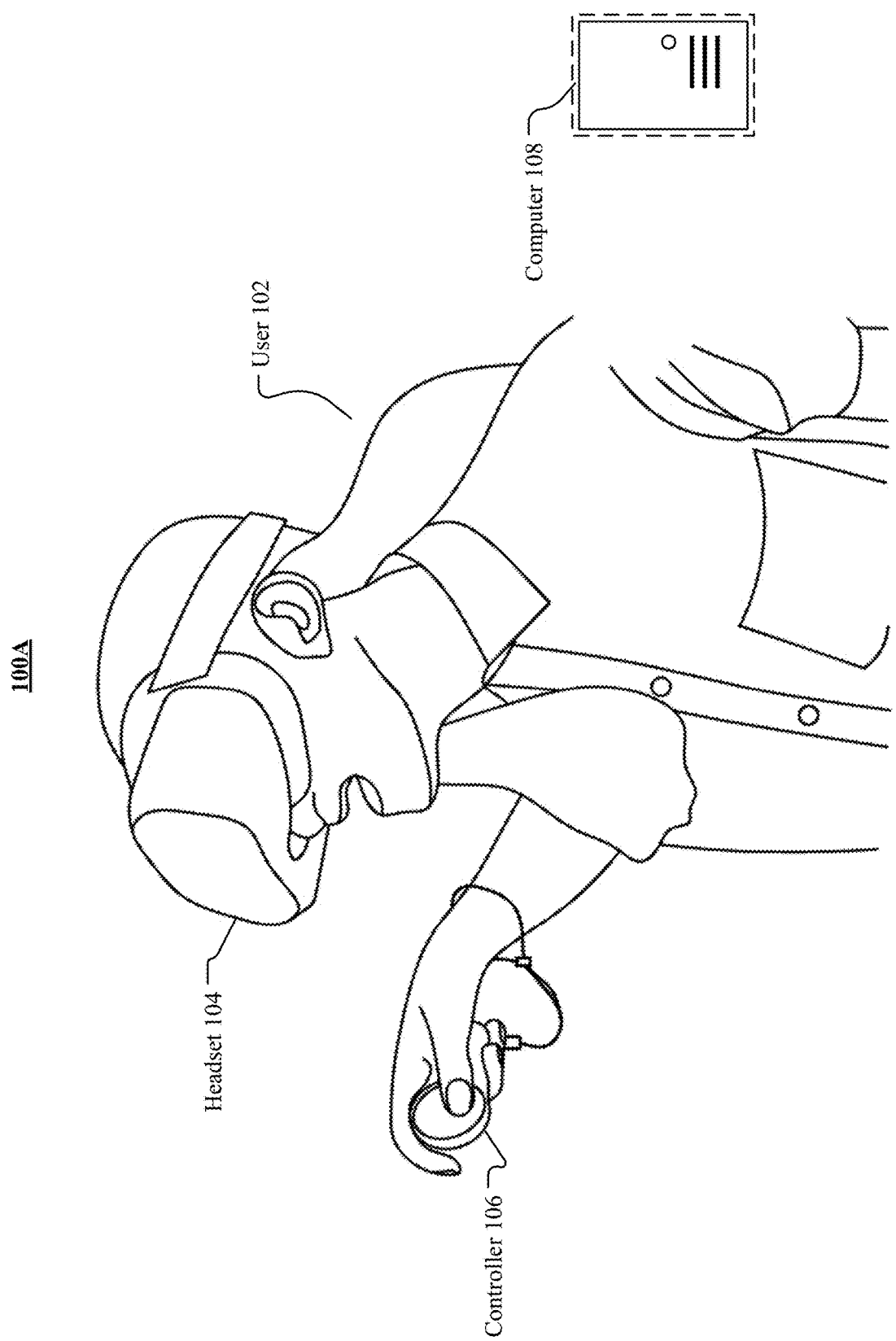
FIG. 1A illustrates an example artificial reality system.

FIG. 1A illustrates an example artificial reality system 100A. In particular embodiments, the artificial reality system 100 may comprise a headset 104, a controller 106, and a computing system 108. A user 102 may wear the headset 104 that may display visual artificial reality content to the user 102. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may be referred as a head-mounted display (HDM). The controller 106 may comprise a trackpad and one or more buttons. The controller 106 may receive inputs from the user 102 and relay the inputs to the computing system 108. The controller 206 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 1B:
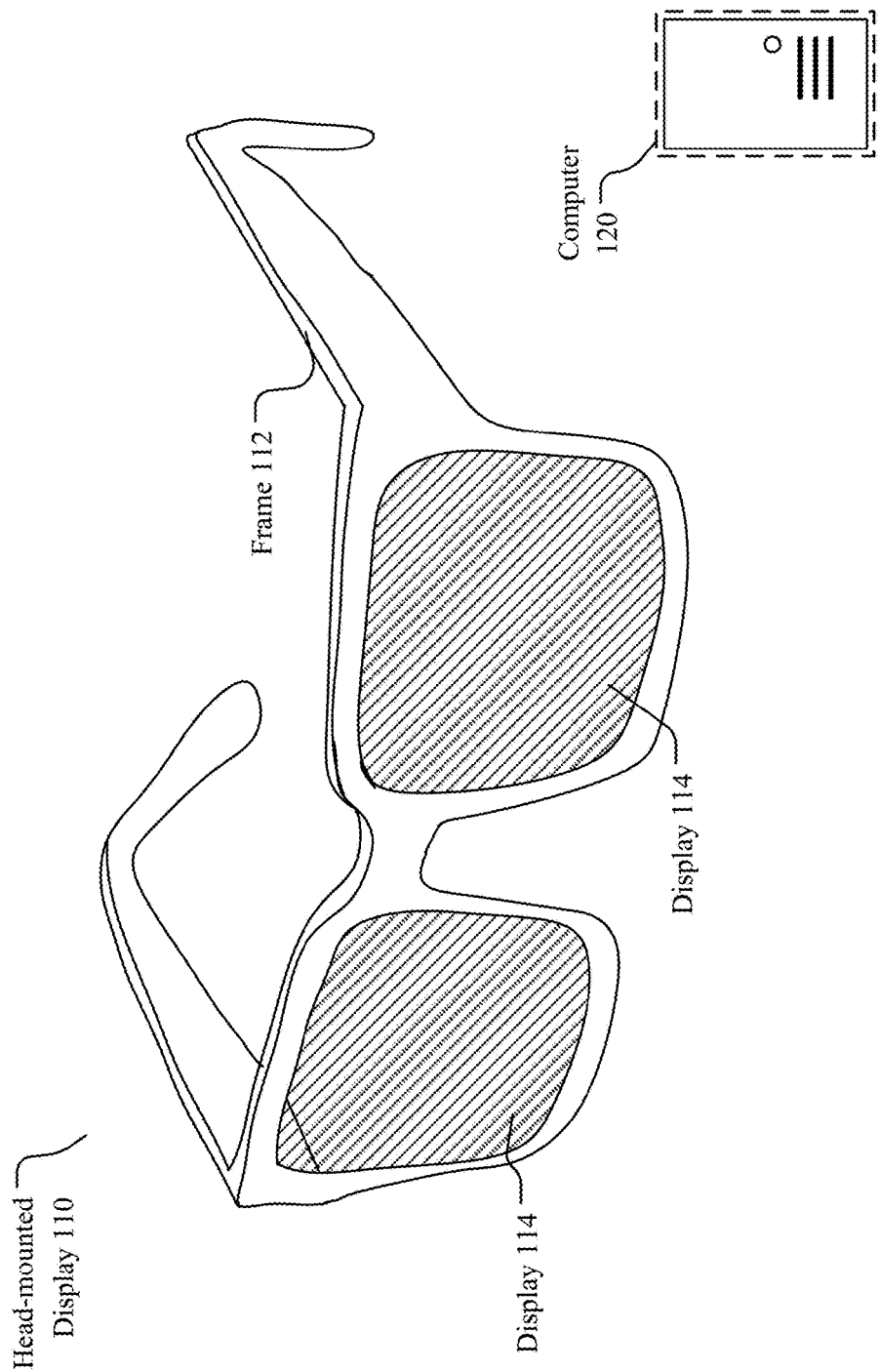
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users.

Figure 1C:
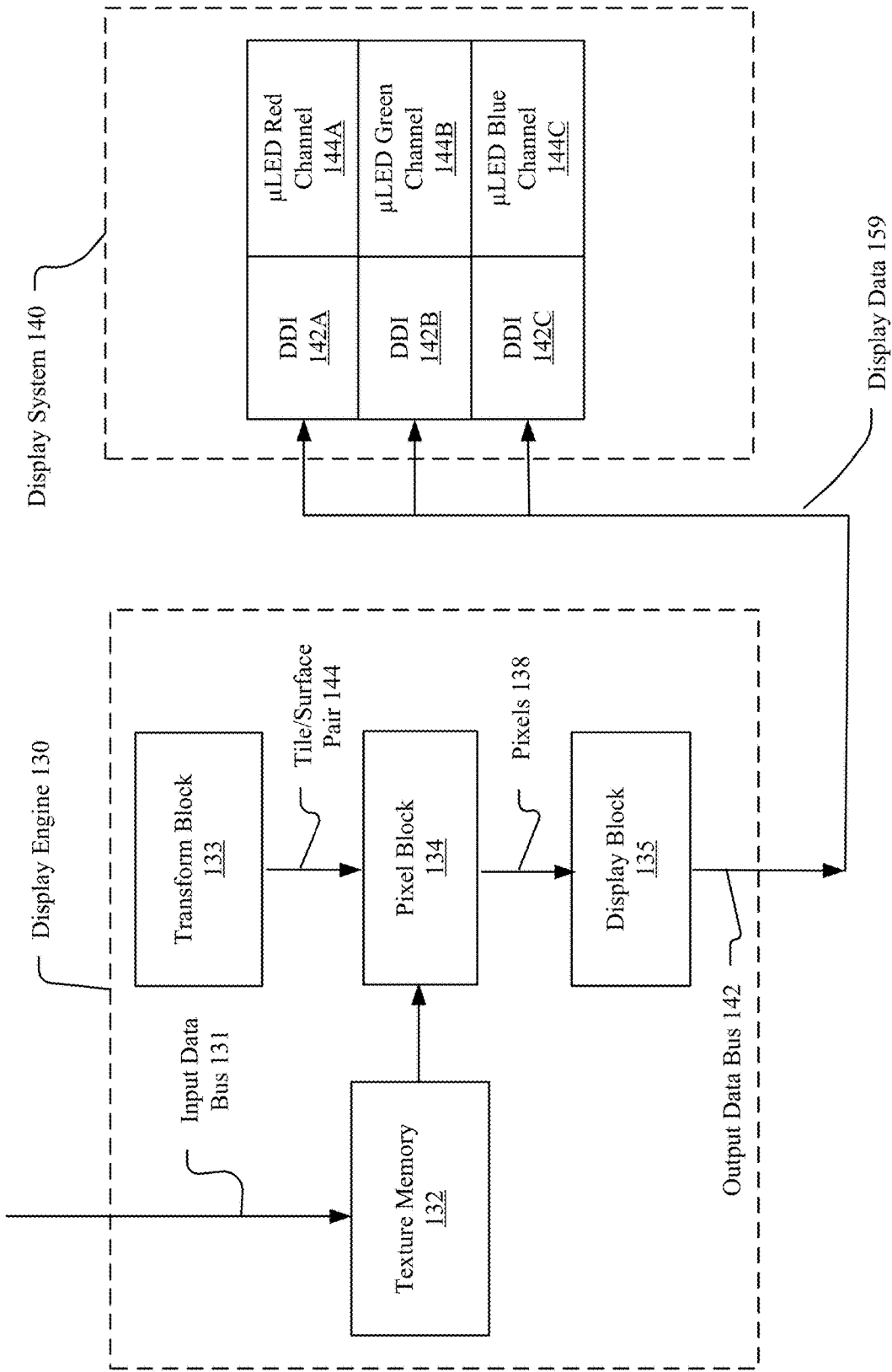
FIG. 1C illustrates an example architecture of a display engine.

FIG. 1C illustrates an example architecture 100C of a display engine 130. In particular embodiments, the processes and methods as described in this disclosure may be embodied or implemented within a display engine 130 (e.g., in the display block 135). The display engine 130 may include, for example, but is not limited to, a texture memory 132, a transform block 133, a pixel block 134, a display block 135, input data bus 131, output data bus 142, etc. In particular embodiments, the display engine 130 may include one or more graphic pipelines for generating images to be rendered on the display. For example, the display engine may use the graphic pipeline(s) to generate a series of subframe images based on a mainframe image and a viewpoint or view angle of the user as measured by one or more eye tracking sensors. The mainframe image may be generated or/and loaded in to the system at a mainframe rate of 30-90 Hz and the subframe rate may be generated at a subframe rate of 1-2 kHz. In particular embodiments, the display engine 130 may include two graphic pipelines for the user's left and right eyes. One of the graphic pipelines may include or may be implemented on the texture memory 132, the transform block 133, the pixel block 134, the display block 135, etc. The display engine 130 may include another set of transform block, pixel block, and display block for the other graphic pipeline. The graphic pipeline(s) may be controlled by a controller or control block (not shown) of the display engine 130. In particular embodiments, the texture memory 132 may be included within the control block or may be a memory unit external to the control block but local to the display engine 130. One or more of the components of the display engine 130 may be configured to communicate via a high-speed bus, shared memory, or any other suitable methods. This communication may include transmission of data as well as control signals, interrupts or/and other instructions. For example, the texture memory 132 may be configured to receive image data through the input data bus 211. As another example, the display block 135 may send the pixel values to the display system 140 through the output data bus 142. In particular embodiments, the display system 140 may include three color channels (e.g., 114A, 114B, 114C) with respective display driver ICs (DDIs) of 142A, 142B, and 143B. In particular embodiments, the display system 140 may include, for example, but is not limited to, light-emitting diode (LED) displays, organic light-emitting diode (OLED) displays, active matrix organic light-emitting diode (AMLED) displays, liquid crystal display (LCD), micro light-emitting diode (μLED) display, electroluminescent displays (ELDs), or any suitable displays.

In particular embodiments, the display engine 130 may include a controller block (not shown). The control block may receive data and control packages such as position data and surface information from controllers external to the display engine 130 though one or more data buses. For example, the control block may receive input stream data from a body wearable computing system. The input data stream may include a series of mainframe images generated at a mainframe rate of 30-90 Hz. The input stream data including the mainframe images may be converted to the required format and stored into the texture memory 132. In particular embodiments, the control block may receive input from the body wearable computing system and initialize the graphic pipelines in the display engine to prepare and finalize the image data for rendering on the display. The data and control packets may include information related to, for example, one or more surfaces including texel data, position data, and additional rendering instructions. The control block may distribute data as needed to one or more other blocks of the display engine 130. The control block may initiate the graphic pipelines for processing one or more frames to be displayed. In particular embodiments, the graphic pipelines for the two eye display systems may each include a control block or share the same control block.

In particular embodiments, the transform block 133 may determine initial visibility information for surfaces to be displayed in the artificial reality scene. In general, the transform block 133 may cast rays from pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye tracking sensors, and/or any suitable tracking/localization algorithms, such as simultaneous localization and mapping (SLAM)) into the artificial scene where surfaces are positioned and may produce tile/surface pairs 144 to send to the pixel block 134. In particular embodiments, the transform block 133 may include a four-stage pipeline as follows. A ray caster may issue ray bundles corresponding to arrays of one or more aligned pixels, referred to as tiles (e.g., each tile may include 16×16 aligned pixels). The ray bundles may be warped, before entering the artificial reality scene, according to one or more distortion meshes. The distortion meshes may be configured to correct geometric distortion effects stemming from, at least, the eye display systems the headset system. The transform block 133 may determine whether each ray bundle intersects with surfaces in the scene by comparing a bounding box of each tile to bounding boxes for the surfaces. If a ray bundle does not intersect with an object, it may be discarded. After the tile-surface intersections are detected, the corresponding tile/surface pairs may be passed to the pixel block 134.

In particular embodiments, the pixel block 134 may determine color values or grayscale values for the pixels based on the tile-surface pairs. The color values for each pixel may be sampled from the texel data of surfaces received and stored in texture memory 132. The pixel block 134 may receive tile-surface pairs from the transform block 133 and may schedule bilinear filtering using one or more filer blocks. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation). In particular embodiments, the pixel block 134 may process the red, green, and blue color components separately for each pixel. In particular embodiments, the display may include two pixel blocks for the two eye display systems. The two pixel blocks of the two eye display systems may work independently and in parallel with each other. The pixel block 134 may then output its color determinations (e.g., pixels 138) to the display block 135. In particular embodiments, the pixel block 134 may composite two or more surfaces into one surface to when the two or more surfaces have overlapping areas. A composed surface may need less computational resources (e.g., computational units, memory, power, etc.) for the resampling process.

In particular embodiments, the display block 135 may receive pixel color values from the pixel block 134, covert the format of the data to be more suitable for the scanline output of the display, apply one or more brightness corrections to the pixel color values, and prepare the pixel color values for output to the display. In particular embodiments, the display block 135 may each include a row buffer and may process and store the pixel data received from the pixel block 134. The pixel data may be organized in quads (e.g., 2×2 pixels per quad) and tiles (e.g., 16×16 pixels per tile). The display block 135 may convert tile-order pixel color values generated by the pixel block 134 into scanline or row-order data, which may be required by the physical displays. The brightness corrections may include any required brightness correction, gamma mapping, and dithering. The display block 135 may output the corrected pixel color values directly to the driver of the physical display (e.g., pupil display) or may output the pixel values to a block external to the display engine 130 in a variety of formats. For example, the eye display systems of the headset system may include additional hardware or software to further customize backend color processing, to support a wider interface to the display, or to optimize display speed or fidelity.

In particular embodiments, the dithering methods and processes (e.g., spatial dithering method, temporal dithering methods, and spatio-temporal methods) as described in this disclosure may be embodied or implemented in the display block 135 of the display engine 130. In particular embodiments, the display block 135 may include a model-based dithering algorithm or a dithering model for each color channel and send the dithered results of the respective color channels to the respective display driver interfaces (DDIs) (e.g., 142A, 142B, 142C) of display system 140. In particular embodiments, before sending the pixel values to the respective display driver interfaces (e.g., 142A, 142B, 142C), the display block 135 may further include one or more algorithms for correcting, for example, pixel non-uniformity, LED non-ideality, waveguide non-uniformity, display defects (e.g., dead pixels), etc.

In particular embodiments, graphics applications (e.g., games, maps, content-providing apps, etc.) may build a scene graph, which is used together with a given view position and point in time to generate primitives to render on a GPU or display engine. The scene graph may define the logical and/or spatial relationship between objects in the scene. In particular embodiments, the display engine 130 may also generate and store a scene graph that is a simplified form of the full application scene graph. The simplified scene graph may be used to specify the logical and/or spatial relationships between surfaces (e.g., the primitives rendered by the display engine 130, such as quadrilaterals or contours, defined in 3D space, that have corresponding textures generated based on the mainframe rendered by the application). Storing a scene graph allows the display engine 130 to render the scene to multiple display frames and to adjust each element in the scene graph for the current viewpoint (e.g., head position), the current object positions (e.g., they could be moving relative to each other) and other factors that change per display frame. In addition, based on the scene graph, the display engine 130 may also adjust for the geometric and color distortion introduced by the display subsystem and then composite the objects together to generate a frame. Storing a scene graph allows the display engine 130 to approximate the result of doing a full render at the desired high frame rate, while actually running the GPU or display engine 130 at a significantly lower rate.

Figure 1D:
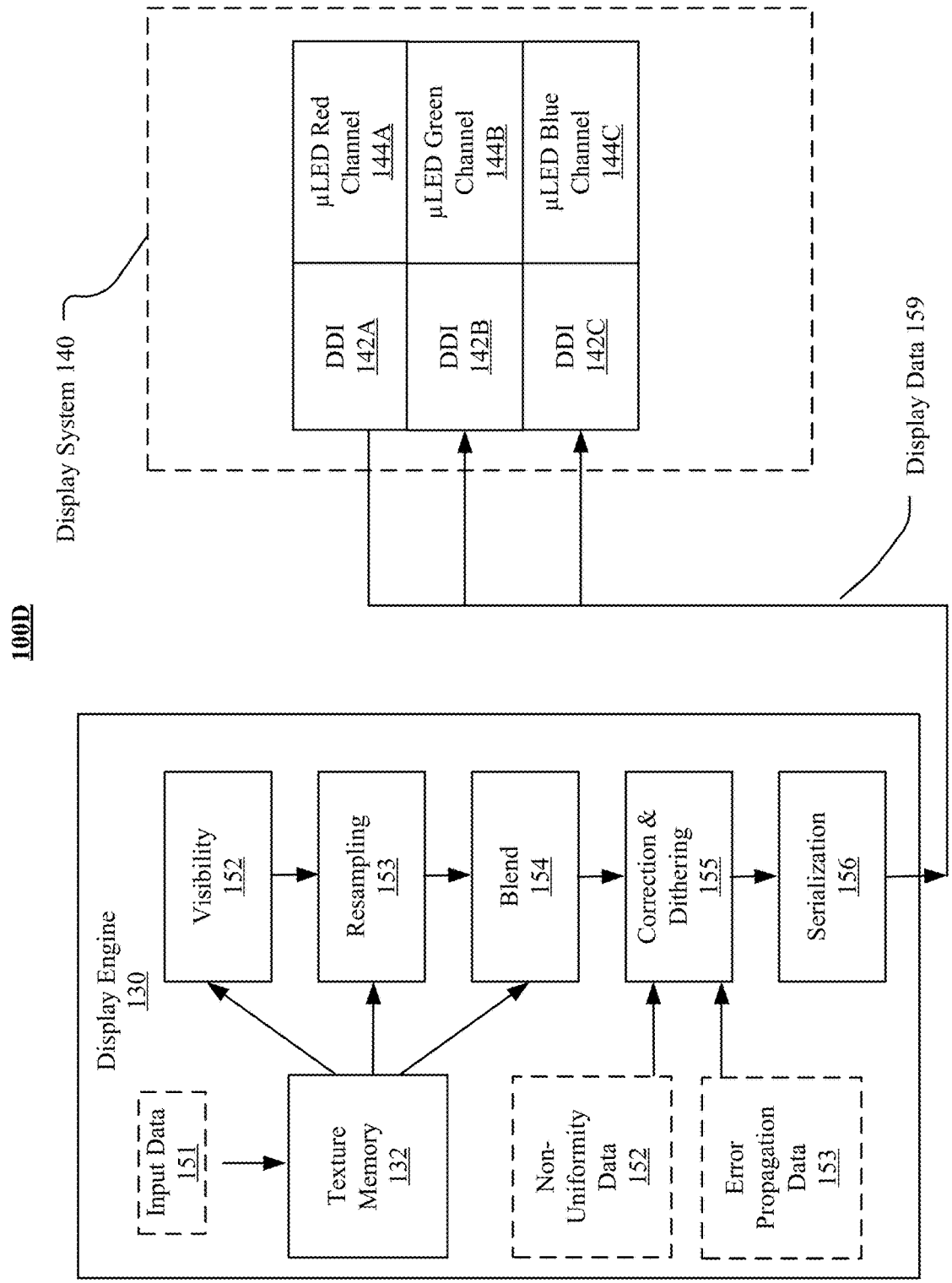
FIG. 1D illustrates an example graphic pipeline of the display engine for generating display image data.

FIG. 1D illustrates an example graphic pipeline 100D of the display engine 130 for generating display image data. In particular embodiments, the graphic pipeline 100D may include a visibility step 152, where the display engine 130 may determine the visibility of one or more surfaces received from the body wearable computing system. The visibility step 152 may be performed by the transform block (e.g., 2133 in FIG. 1C) of the display engine 130. The display engine 130 may receive (e.g., by a control block or a controller) input data 151 from the body-wearable computing system. The input data 151 may include one or more surfaces, texel data, position data, RGB data, and rendering instructions from the body wearable computing system. The input data 151 may include mainframe images with 30-90 frames per second (FPS). The main frame image may have color depth of, for example, 24 bits per pixel. The display engine 130 may process and save the received input data 151 in the texel memory 132. The received data may be passed to the transform block 133 which may determine the visibility information for surfaces to be displayed. The transform block 133 may cast rays for pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye trackers, and/or any suitable tracking/localization algorithms, such as simultaneous localization and mapping (SLAM)) into the artificial scene where surfaces are positioned and produce surface-tile pairs to send to the pixel block 134.

In particular embodiments, the graphic pipeline 100D may include a resampling step 153, where the display engine 130 may determine the color values from the tile-surfaces pairs to produce pixel color values. The resampling step 153 may be performed by the pixel block 134 in FIG. 1C) of the display engine 130. The pixel block 134 may receive tile-surface pairs from the transform block 133 and may schedule bilinear filtering. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation) and output the determined pixel values to the respective display block 135.

In particular embodiments, the graphic pipeline 100D may include a bend step 154, a correction and dithering step 155, a serialization step 156, etc. In particular embodiments, the bend step, correction and dithering step, and serialization steps of 154, 155, and 156 may be performed by the display block (e.g., 135 in FIG. 1C) of the display engine 130. The display engine 130 may blend the display content for display content rendering, apply one or more brightness corrections to the pixel color values, perform one or more dithering algorithms for dithering the quantization errors both spatially and temporally, serialize the pixel values for scanline output for the physical display, and generate the display data 159 suitable for the display system 140. The display engine 130 may send the display data 159 to the display system 140. In particular embodiments, the display system 140 may include three display driver Ics (e.g., 142A, 142B, 142C) for the pixels of the three color channels of RGB (e.g., 144A, 144B, 144C).

Figure 2A:
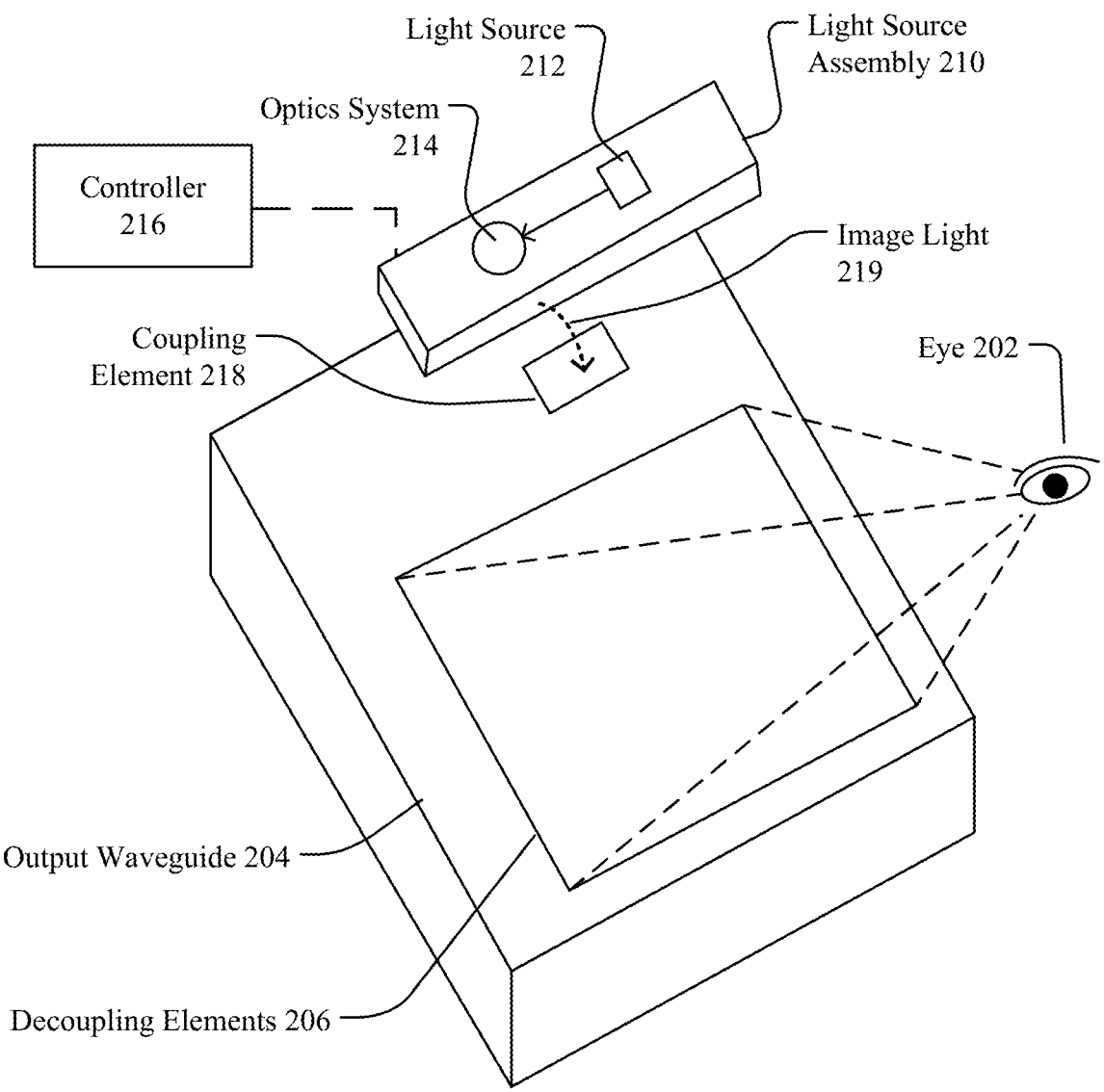
FIG. 2A illustrates an example scanning waveguide display.
Figure 3A:
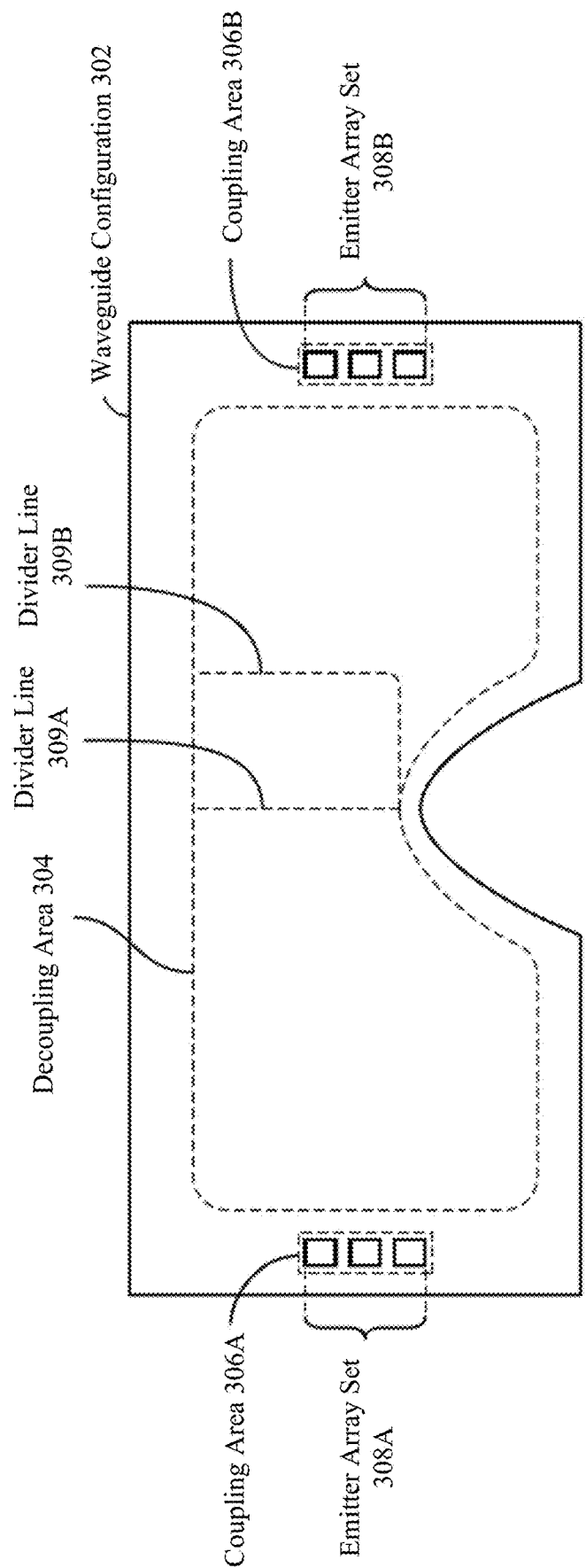
FIG. 3A illustrates an example 2D micro-LED waveguide display.

FIG. 2A illustrates an example scanning waveguide display 200A. In particular embodiments, the head-mounted display (HMD) of the AR/VR system may include a near eye display (NED) which may be a scanning waveguide display 200A. The scanning waveguide display 200A may include a light source assembly 210, an output waveguide 204, a controller 216, etc. The scanning waveguide display 200A may provide images for both eyes or for a single eye. For purposes of illustration, FIG. 3A shows the scanning waveguide display 200A associated with a single eye 202. Another scanning waveguide display (not shown) may provide image light to the other eye of the user and the two scanning waveguide displays may share one or more components or may be separated. The light source assembly 210 may include a light source 212 and an optics system 214. The light source 212 may include an optical component that could generate image light using an array of light emitters. The light source 212 may generate image light including, for example, but not limited to, red image light, blue image light, green image light, infra-red image light, etc. The optics system 214 may perform a number of optical processes or operations on the image light generated by the light source 212. The optical processes or operations performed by the optics systems 214 may include, for example, but are not limited to, light focusing, light combining, light conditioning, scanning, etc.

In particular embodiments, the optics system 214 may include a light combining assembly, a light conditioning assembly, a scanning mirror assembly, etc. The light source assembly 210 may generate and output an image light 219 to a coupling element 218 of the output waveguide 204. The output waveguide 204 may be an optical waveguide that could output image light to the user eye 202. The output waveguide 204 may receive the image light 219 at one or more coupling elements 218 and guide the received image light to one or more decoupling elements 206. The coupling element 218 may be, for example, but not limited to, a diffraction grating, a holographic grating, any other suitable elements that can couple the image light 219 into the output waveguide 204, or a combination thereof. As an example and not by way of limitation, if the coupling element 350 is a diffraction grating, the pitch of the diffraction grating may be chosen to allow the total internal reflection to occur and the image light 219 to propagate internally toward the decoupling element 206. The pitch of the diffraction grating may be in the range of 300 nm to 600 nm. The decoupling element 206 may decouple the total internally reflected image light from the output waveguide 204. The decoupling element 206 may be, for example, but is not limited to, a diffraction grating, a holographic grating, any other suitable element that can decouple image light out of the output waveguide 204, or a combination thereof. As an example and not by way of limitation, if the decoupling element 206 is a diffraction grating, the pitch of the diffraction grating may be chosen to cause incident image light to exit the output waveguide 204. The orientation and position of the image light exiting from the output waveguide 204 may be controlled by changing the orientation and position of the image light 219 entering the coupling element 218. The pitch of the diffraction grating may be in the range of 300 nm to 600 nm.

In particular embodiments, the output waveguide 204 may be composed of one or more materials that can facilitate total internal reflection of the image light 219. The output waveguide 204 may be composed of one or more materials including, for example, but not limited to, silicon, plastic, glass, polymers, or some combination thereof. The output waveguide 204 may have a relatively small form factor. As an example and not by way of limitation, the output waveguide 204 may be approximately 50 mm wide along X-dimension, 30 mm long along Y-dimension and 0.5-1 mm thick along Z-dimension. The controller 216 may control the scanning operations of the light source assembly 210. The controller 216 may determine scanning instructions for the light source assembly 210 based at least on the one or more display instructions for rendering one or more images. The display instructions may include an image file (e.g., bitmap) and may be received from, for example, a console or computer of the AR/VR system. Scanning instructions may be used by the light source assembly 210 to generate image light 219. The scanning instructions may include, for example, but are not limited to, an image light source type (e.g., monochromatic source, polychromatic source), a scanning rate, a scanning apparatus orientation, one or more illumination parameters, or some combination thereof. The controller 216 may include a combination of hardware, software, firmware, or any suitable components supporting the functionality of the controller 216.

Figure 2B:
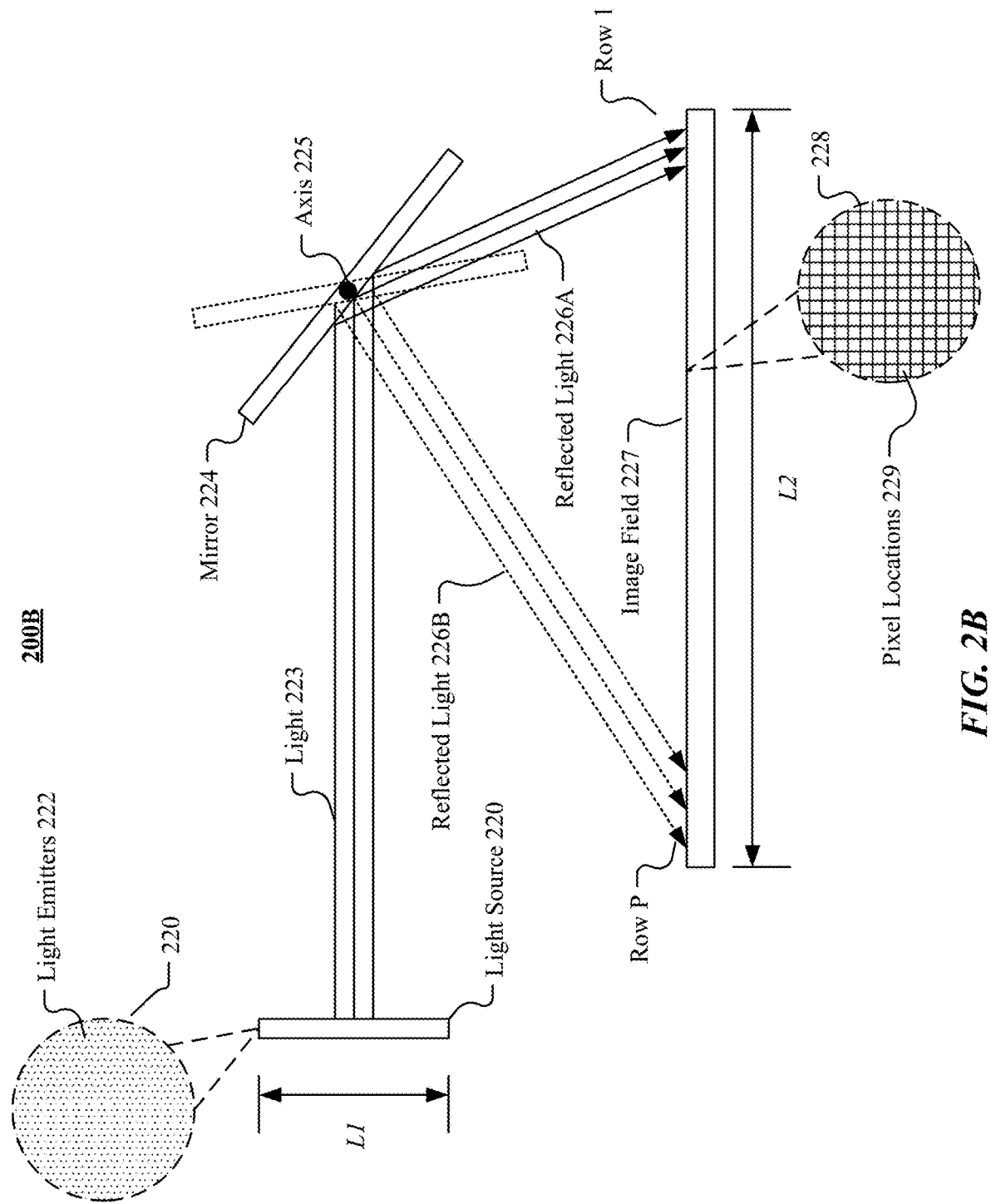
FIG. 2B illustrates an example scanning operation of the scanning waveguide display.

FIG. 2B illustrates an example scanning operation of a scanning waveguide display 200B. The light source 220 may include an array of light emitters 222 (as represented by the dots in inset) with multiple rows and columns. The light 223 emitted by the light source 220 may include a set of collimated beams of light emitted by each column of light emitters 222. Before reaching the mirror 224, the light 223 may be conditioned by different optical devices such as the conditioning assembly (not shown). The mirror 224 may reflect and project the light 223 from the light source 220 to the image field 227 by rotating about an axis 225 during scanning operations. The mirror 224 may be a microelectromechanical system (MEMS) mirror or any other suitable mirror. As the mirror 224 rotates about the axis 225, the light 223 may be projected to a different part of the image field 227, as illustrated by the reflected part of the light 226A in solid lines and the reflected part of the light 226B in dash lines.

In particular embodiments, the image field 227 may receive the light 226A-B as the mirror 224 rotates about the axis 225 to project the light 226A-B in different directions. For example, the image field 227 may correspond to a portion of the coupling element 218 or a portion of the decoupling element 206 in FIG. 2A. In particular embodiments, the image field 227 may include a surface of the coupling element 206. The image formed on the image field 227 may be magnified as light travels through the output waveguide 220. In particular embodiments, the image field 227 may not include an actual physical structure but include an area to which the image light is projected to form the images. The image field 227 may also be referred to as a scan field. When the light 223 is projected to an area of the image field 227, the area of the image field 227 may be illuminated by the light 223. The image field 227 may include a matrix of pixel locations 229 (represented by the blocks in inset 228) with multiple rows and columns. The pixel location 229 may be spatially defined in the area of the image field 227 with a pixel location corresponding to a single pixel. In particular embodiments, the pixel locations 229 (or the pixels) in the image field 227 may not include individual physical pixel elements. Instead, the pixel locations 229 may be spatial areas that are defined within the image field 227 and divide the image field 227 into pixels. The sizes and locations of the pixel locations 229 may depend on the projection of the light 223 from the light source 220. For example, at a given rotation angle of the mirror 224, light beams emitted from the light source 220 may fall on an area of the image field 227. As such, the sizes and locations of pixel locations 229 of the image field 227 may be defined based on the location of each projected light beam. In particular embodiments, a pixel location 229 may be subdivided spatially into subpixels (not shown). For example, a pixel location 229 may include a red subpixel, a green subpixel, and a blue subpixel. The red, green and blue subpixels may correspond to respective locations at which one or more red, green and blue light beams are projected. In this case, the color of a pixel may be based on the temporal and/or spatial average of the pixel's subpixels.

In particular embodiments, the light emitters 222 may illuminate a portion of the image field 227 (e.g., a particular subset of multiple pixel locations 229 on the image field 227) with a particular rotation angle of the mirror 224. In particular embodiment, the light emitters 222 may be arranged and spaced such that a light beam from each of the light emitters 222 is projected on a corresponding pixel location 229. In particular embodiments, the light emitters 222 may include a number of light-emitting elements (e.g., micro-LEDs) to allow the light beams from a subset of the light emitters 222 to be projected to a same pixel location 229. In other words, a subset of multiple light emitters 222 may collectively illuminate a single pixel location 229 at a time. As an example and not by way of limitation, a group of light emitter including eight light-emitting elements may be arranged in a line to illuminate a single pixel location 229 with the mirror 224 at a given orientation angle.

In particular embodiments, the number of rows and columns of light emitters 222 of the light source 220 may or may not be the same as the number of rows and columns of the pixel locations 229 in the image field 227. In particular embodiments, the number of light emitters 222 in a row may be equal to the number of pixel locations 229 in a row of the image field 227 while the light emitters 222 may have fewer columns than the number of pixel locations 229 of the image field 227. In particular embodiments, the light source 220 may have the same number of columns of light emitters 222 as the number of columns of pixel locations 229 in the image field 227 but fewer rows. As an example and not by way of limitation, the light source 220 may have about 1280 columns of light emitters 222 which may be the same as the number of columns of pixel locations 229 of the image field 227, but only a handful rows of light emitters 222. The light source 220 may have a first length L1 measured from the first row to the last row of light emitters 222. The image field 530 may have a second length L2, measured from the first row (e.g., Row 1) to the last row (e.g., Row P) of the image field 227. The L2 may be greater than L1 (e.g., L2 is 50 to 10,000 times greater than L1).

In particular embodiments, the number of rows of pixel locations 229 may be larger than the number of rows of light emitters 222. The display device 200B may use the mirror 224 to project the light 223 to different rows of pixels at different time. As the mirror 520 rotates and the light 223 scans through the image field 227, an image may be formed on the image field 227. In some embodiments, the light source 220 may also has a smaller number of columns than the image field 227. The mirror 224 may rotate in two dimensions to fill the image field 227 with light, for example, using a raster-type scanning process to scan down the rows then moving to new columns in the image field 227. A complete cycle of rotation of the mirror 224 may be referred to as a scanning period which may be a predetermined cycle time during which the entire image field 227 is completely scanned. The scanning of the image field 227 may be determined and controlled by the mirror 224 with the light generation of the display device 200B being synchronized with the rotation of the mirror 224. As an example and not by way of limitation, the mirror 224 may start at an initial position projecting light to Row 1 of the image field 227, and rotate to the last position that projects light to Row P of the image field 227, and then rotate back to the initial position during one scanning period. An image (e.g., a frame) may be formed on the image field 227 per scanning period. The frame rate of the display device 200B may correspond to the number of scanning periods in a second. As the mirror 224 rotates, the light may scan through the image field to form images. The actual color value and light intensity or brightness of a given pixel location 229 may be a temporal sum of the color various light beams illuminating the pixel location during the scanning period. After completing a scanning period, the mirror 224 may revert back to the initial position to project light to the first few rows of the image field 227 with a new set of driving signals being fed to the light emitters 222. The same process may be repeated as the mirror 224 rotates in cycles to allow different frames of images to be formed in the scanning field 227.

Figure 3B:
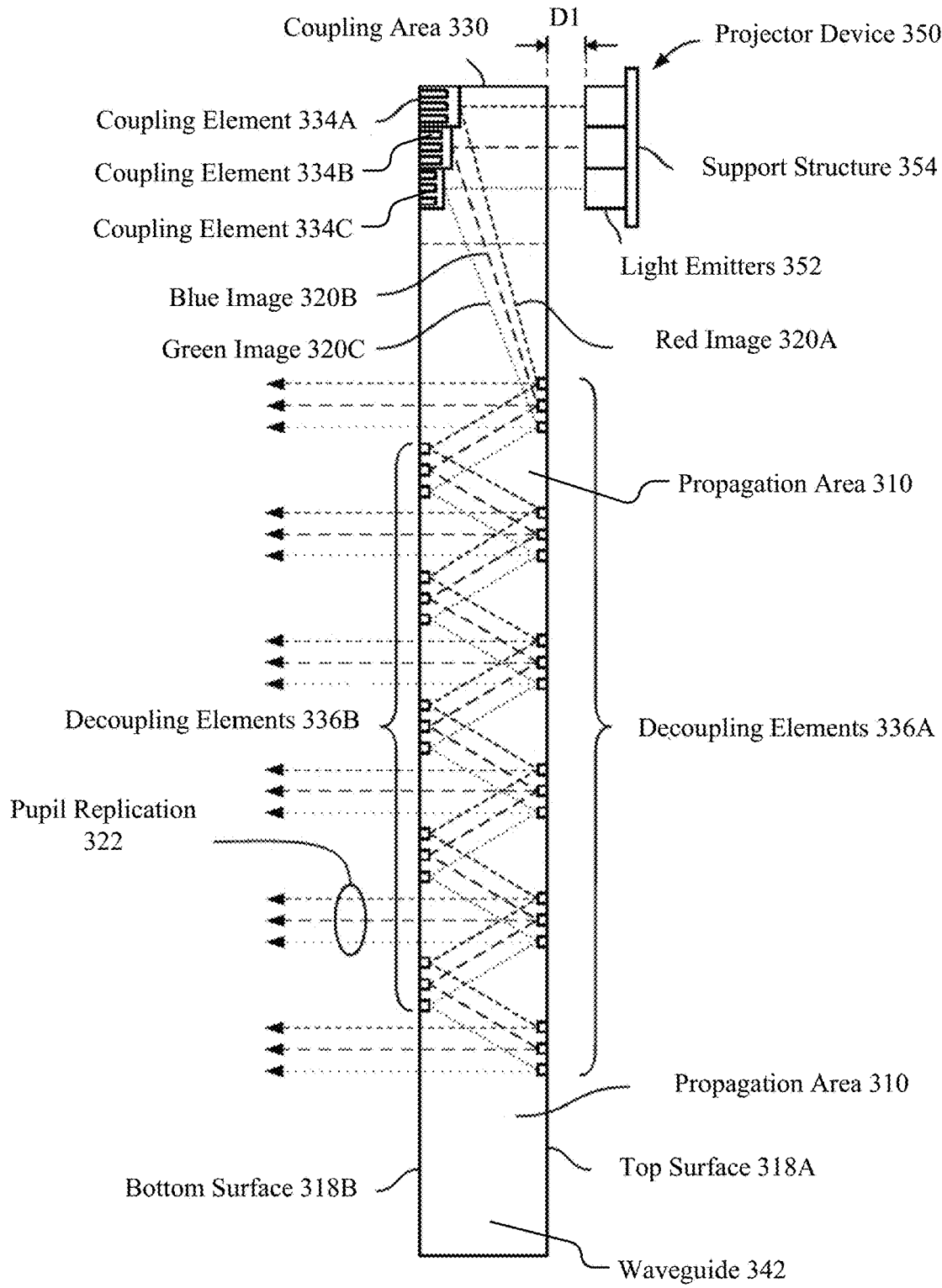
FIG. 3B illustrates an example waveguide configuration for the 2D micro-LED waveguide display.

FIG. 3A illustrates an example 2D micro-LED waveguide display 300A. In particular embodiments, the display 300A may include an elongate waveguide configuration 302 that may be wide or long enough to project images to both eyes of a user. The waveguide configuration 302 may include a decoupling area 304 covering both eyes of the user. In order to provide images to both eyes of the user through the waveguide configuration 302, multiple coupling areas 306A-B may be provided in a top surface of the waveguide configuration 302. The coupling areas 306A and 306B may include multiple coupling elements to receive image light from light emitter array sets 308A and 308B, respectively. Each of the emitter array sets 308A-B may include a number of monochromatic emitter arrays including, for example, but not limited to, a red emitter array, a green emitter array, and a blue emitter array. In particular embodiments, the emitter array sets 308A-B may further include a white emitter array or an emitter array emitting other colors or any combination of any multiple colors. In particular embodiments, the waveguide configuration 302 may have the emitter array sets 308A and 308B covering approximately identical portions of the decoupling area 304 as divided by the divider line 309A. In particular embodiments, the emitter array sets 308A and 308B may provide images to the waveguide of the waveguide configuration 302 asymmetrically as divided by the divider line 309B. For example, the emitter array set 308A may provide image to more than half of the decoupling area 304. In particular embodiments, the emitter array sets 308A and 308B may be arranged at opposite sides (e.g., 180° apart) of the waveguide configuration 302 as shown in FIG. 3B. In other embodiments, the emitter array sets 308A and 308B may be arranged at any suitable angles. The waveguide configuration 302 may be planar or may have a curved cross-sectional shape to better fit to the face/head of a user.

FIG. 3B illustrates an example waveguide configuration 300B for the 2D micro-LED waveguide display. In particular embodiments, the waveguide configuration 300B may include a projector device 350 coupled to a waveguide 342. The projector device 320 may include a number of light emitters 352 (e.g., monochromatic emitters) secured to a support structure 354 (e.g., a printed circuit board or other suitable support structure). The waveguide 342 may be separated from the projector device 350 by an air gap having a distance of D1 (e.g., approximately 50 µm to approximately 500 µm). The monochromatic images projected by the projector device 350 may pass through the air gap toward the waveguide 342. The waveguide 342 may be formed from a glass or plastic material. The waveguide 342 may include a coupling area 330 including a number of coupling elements 334A-C for receiving the emitted light from the projector device 350. The waveguide 342 may include a decoupling area with a number of decoupling elements 336A on the top surface 318A and a number of decoupling elements 336B on the bottom surface 318B. The area within the waveguide 342 in between the decoupling elements 336A and 336B may be referred as a propagation area 310, in which image light received from the projector device 350 and coupled into the waveguide 342 by the coupling element 334 may propagate laterally within the waveguide 342.

The coupling area 330 may include coupling elements (e.g., 334A, 334B, 334C) configured and dimensioned to couple light of predetermined wavelengths (e.g., red, green, blue). When a white light emitter array is included in the projector device 350, the portion of the white light that falls in the predetermined wavelengths may be coupled by each of the coupling elements 334A-C. In particular embodiments, the coupling elements 334A-B may be gratings (e.g., Bragg gratings) dimensioned to couple a predetermined wavelength of light. In particular embodiments, the gratings of each coupling element may exhibit a separation distance between gratings associated with the predetermined wavelength of light and each coupling element may have different grating separation distances. Accordingly, each coupling element (e.g., 334A-C) may couple a limited portion of the white light from the white light emitter array of the projector device 350 if white light emitter array is included in the projector device 350. In particular embodiments, each coupling element (e.g., 334A-C) may have the same grating separation distance. In particular embodiments, the coupling elements 334A-C may be or include a multiplexed coupler.

As illustrated in FIG. 3B, a red image 320A, a blue image 320B, and a green image 320C may be coupled by the coupling elements 334A, 334B, 334C, respectively, into the propagation area 310 and may begin to traverse laterally within the waveguide 342. A portion of the light may be projected out of the waveguide 342 after the light contacts the decoupling element 336A for one-dimensional pupil replication, and after the light contacts both the decoupling elements 336A and 336B for two-dimensional pupil replication. In two-dimensional pupil replication, the light may be projected out of the waveguide 342 at locations where the pattern of the decoupling element 336A intersects the pattern of the decoupling element 336B. The portion of the light that is not projected out of the waveguide 342 by the decoupling element 336A may be reflected off the decoupling element 336B. The decoupling element 336B may reflect all incident light back toward the decoupling element 336A. Accordingly, the waveguide 342 may combine the red image 320A, the blue image 320B, and the green image 320C into a polychromatic image instance which may be referred as a pupil replication 322. The polychromatic pupil replication 322 may be projected to the user's eyes which may interpret the pupil replication 322 as a full color image (e.g., an image including colors addition to red, green, and blue). The waveguide 342 may produce tens or hundreds of pupil replication 322 or may produce a single replication 322.

In particular embodiments, the AR/VR system may use scanning waveguide displays or 2D micro-LED displays for displaying AR/VR content to users. In order to miniaturize the AR/VR system, the display system may need to miniaturize the space for pixel circuits and may have limited number of available bits for the display. The number of available bits in a display may limit the display's color depth or gray scale level, and consequently limit the quality of the displayed images. Furthermore, the waveguide displays used for AR/VR systems may have nonuniformity problem cross all display pixels. The compensation operations for pixel nonuniformity may result in loss on image grayscale and further reduce the quality of the displayed images. For example, a waveguide display with 8-bit pixels (i.e., 256 gray level) may equivalently have 6-bit pixels (i.e., 64 gray level) after compensation of the nonuniformity (e.g., 8:1 waveguide nonuniformity, 0.1% dead micro-LED pixel, and 20% micro-LED intensity nonuniformity).

Unlike traditional LED-based or µLED-based displays, the displays based on CS-µLEDs (e.g., GaN µLEDs, III-N LEDs, InGaN LEDs, etc.) may emit light of different colors according to the applied current. In the meantime, the intensities of the emitted light may be proportional to the current densities of the driving signals. As a result, it could be difficult for the CS-µLEDs-based displays to control both color and light intensity to provide grayscale dynamic ranges like the displays using traditional LEDs. To solve these problems, particular embodiments of the system may use a dithering technique to allow the CS-µLEDs-based display to support a variety of colors with corresponding luminance for displaying images. The system may use current to control the color of the emitted light and use PWM driving signals with particular setting parameters to control the brightness to generate a limited number of primary colors. The system may control the CS-µLEDs to produce two or more primary colors which in combination may produce a number of pre-determined colors with particular luminance values corresponding to a three-dimensional color gamut for the display. To display an image, the system may map the image pixel colors (e.g., defined in a tristimulus color space) to the three-dimensional color gamut of the CS-µLEDs-based display. The system may identify colors defined in the three-dimensional color gamut to represent corresponding image pixel colors and use a dithering technique to quantize the mapped colors to the colors that the display is capable showing.

By using CS-µLEDs-based displays, particular embodiments of the system may allow the display system to have lower latency, higher contrast ratio, greater color saturation, intrinsic self-illumination, and better efficiency than traditional displays. By using a limited number of pre-determined colors with particular luminance values, particular embodiments of the system may have a three-dimensional color gamut that could be tetrahedralized to be used for displaying images. By using a limited number of primary colors, particular embodiments of the system may only need to provide a limited number of driving current densities to the display panels. As a result, particular embodiments of the system may allow CS-µLEDs-based display to display images with the visual effect that appears to have a wide range of colors and a large dynamic range.

Figure 4:
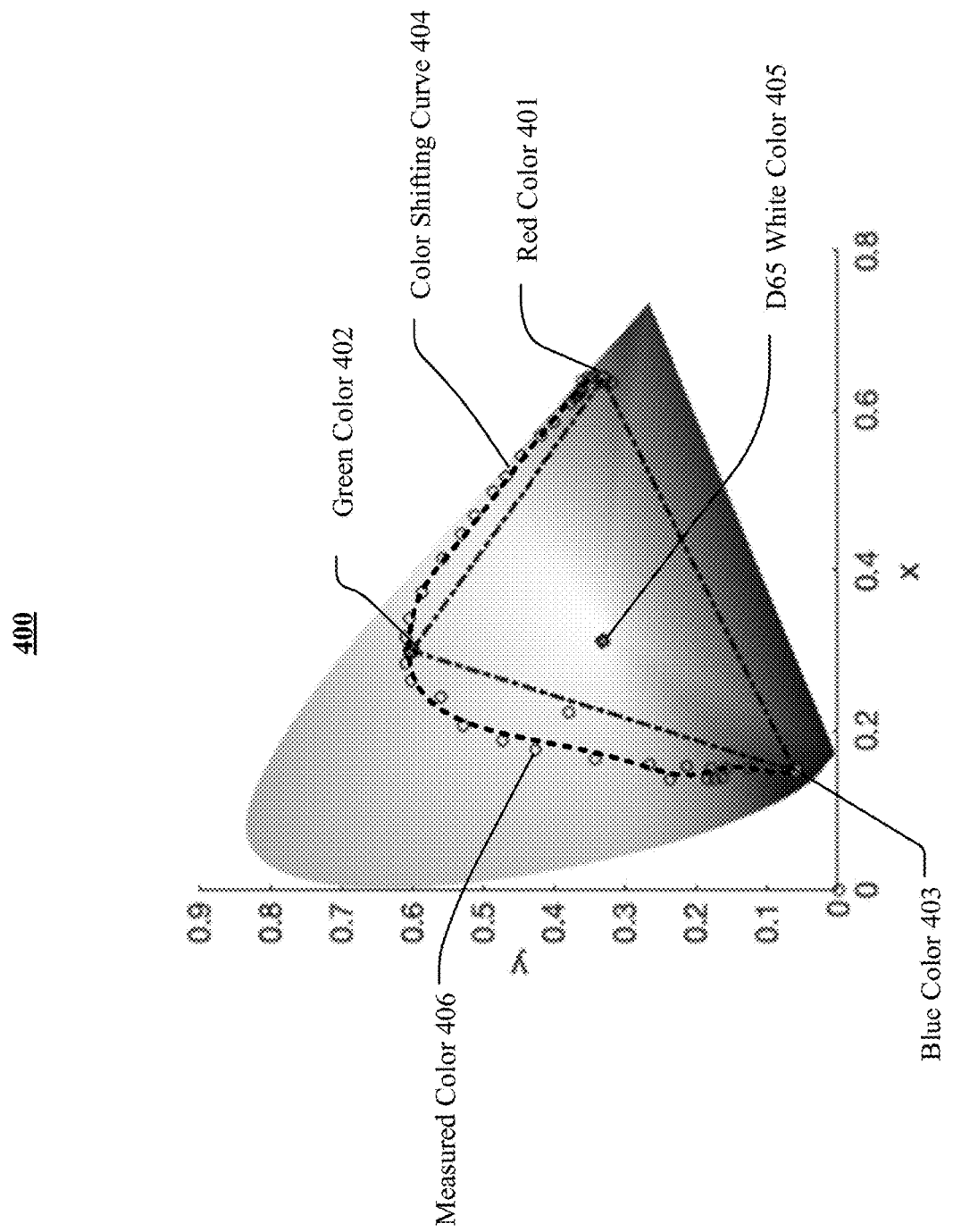
FIG. 4 illustrates an example chromaticity diagram showing an example color shifting curve of color-shifting μLEDs.

In particular embodiments, the AR/VR system may use CS-µLEDs (e.g., micro-light-emitting diodes) for displaying images to users. It is notable that the CS-µLEDs (i.e., micro-LEDs) as described in this disclosure are not limited to any particular type or materials. For example, the CS-µLEDs may be GaN LEDs (i.e., gallium nitride light-emitting diodes), InGaN LEDS (i.e., indium gallium nitride light-emitting diodes), III-N LEDs (i.e., III-nitride light emitting diodes), or any suitable light-emitting diodes. In particular embodiments, CS-µLEDs may be made from a very thin layer of heavily doped semiconductor material. Depending on the semiconductor material used and the amount of doping, when forward biased, a CS-µLED may emit light at a particular spectral wavelength corresponding to a particular color. The materials (e.g., indium gallium nitride) that are used to make the CS-µLEDs may be mixed with different ratios resulting in the different wavelengths of the emitted light. For example, the CS-µLEDs may comprise of III-N materials and related alloys and may be grown along a polar crystal growth direction. The alloy compositions, epitaxial layers, doping, and other parameters (e.g., number and thickness of quantum wells and barriers, growth orientations, growth conditions, etc.) may be optimized for certain color-shifting properties. In particular embodiments, the CS-µLEDs may be referred to as III-N LEDs, GaN LEDs, InGaN LEDs, etc. When CS-µLEDs is forward biased, electrons from the semiconductor conduction band may combine with holes form the valance band releasing energy to produce photons and allow the CS-µLEDs to emit light of particular colors. The dominant wavelength (color) of a CS-µLED may change with the forward current. As an example and not by way of limitation, InGaN LEDs may exhibit a color shift due to different concentrations of converter material, in addition to a change of wavelength with forward voltage for the blue-emitting InGaN material. As another example and not by way of limitation. GaN LEDs may shift color along a color shifting curve as shown in FIG. 4 when the forward current have different current densities. It is notable that the color shifting curve as illustrated in FIG. 4 is for example purpose and the CS-µLEDs are not limited thereto. For example, the CS-µLEDs may shift the color of the emitted light along any color shifting curves as pre-measured using instrumentations.

FIG. 4 illustrates an example chromaticity diagram 400 showing an example color shifting curve 404 of color-shifting µLEDs. In particular embodiments, the AR/VR display systems may use CS-µLEDs (e.g., III-N LEDs, GaN LEDs, InGaN LEDs) for displaying images to users. Unlike traditional displays, CS-µLEDs may emit light with different colors according to the applied current. As an example and not by way of limitation, the CS-µLEDs may emit light with different colors ranging from red color 401 to green color 402, and blue color 403, following a color-shifting curve 404 in the chromaticity diagram 400 when the applied current density increases across a pre-determine range (e.g., 5 orders of magnitude). In the meantime, the brightness level of the emitted light may change proportionally to the applied current density. As a result, the red color 401 may be relatively dim red color. The green color 402 may be much brighter than the red color 401. The blue color 403 may be much brighter than the green color 402. Given appropriate driving signals, the CS-µLEDs may emit any colors of particular brightness levels along the color shifting curve 404. The color shifting curve 404 of particular CS-µLEDs may be determined by measuring the emitted light color (and luminance values) while changing the current density of driving signals across a pre-determined range (e.g., 5 orders of magnitude). The color shifting curve 404 may be determined, for example, using curve-fitting algorithm, based on the measured colors (e.g., 406) driven by signals of different current densities. It is notable that although the chromaticity diagram 400 is illustrated using grayscale printing instead of color printing in FIG. 4. Each point in the chromaticity diagram 400 of FIG. 4 may represent a color by a corresponding chromaticity coordinates (x, y). The red color 401, the green color 402, and the blue color 403 in the chromaticity diagram 400 may correspond to the RGB primary colors for the standard RGB (sRGB) color space. The white color point 405 may correspond to a D65 white color (i.e., CIE standard illuminant D65) which is formed by a combination of two or more primaries.

Although the CS-µLEDs may emit light with red, green, and blue colors, it may be impractical to use CS-µLEDs to generate RGB primary colors to create a large number of colors like the traditional RGB LEDs. Because the both the color and brightness of the emitted light change with applied current, it could be difficult for CS-µLEDs to provide grayscales with a large dynamic range for particular fixed colors like the traditional RGB LEDs. In particular embodiments, the system may use the current density (which is proportional to the current amplitude) to control the color of the emitted light and use pulse width modulation (PWM) signals with particular PWM parameters (e.g., duty cycle) to control the brightness level of the emitted light. The CS-µLEDs as controlled by the PWM signals may operate in an ON/OFF mode to generate the visual effect of different brightness levels of the emitted light. For example, a longer duty cycle of the PWM signals may generate a visual effect corresponding to a higher brightness level. A shorter duty cycle of the PWM signals may generate a visual effect corresponding to a lower brightness level. In this disclosure, the term "brightness" and "brightness level" may correspond to "light intensity" or "luminance values" of the emitted light. However, even the brightness level of the emitted light may be controlled by PWM signals with different PWM parameters, it could be difficult for CS-µLEDs to rely on PWM signals to provide a large dynamic range of grayscale levels like traditional RGB LEDs. At the same time, since the current density needs to change cross a large range (e.g., a range covering 5 orders of magnitude) to shift the emitted light color from red to blue, it could be difficult to control CS-µLEDs to directly emit light with a larger number of desired colors that are needed for displaying images.

In particular embodiments, to solve these problems, the system may determine a limited N number of primary colors for the CS-µLEDs-based display and render and display images based on these limited number of primary colors. As an example and not by way limitation, the system may pre-determine 9 primary colors along the color shifting curve 404 in the chromaticity diagram 400. As a result, the system may have 10 pre-determined primary colors including the 9 primary colors selected based on the color shifting curve 400 and the back color corresponding to a turning-off status of CS-µLEDs. The 10 pre-determined primary colors may include the red, green, and blue colors. The intensities of these red, green, and blue colors may be set in respective values that allow the three colors to produce a D65 white point 405 in combination. The remaining primary colors and their intensities may be determined with a constraint condition which allows the sum of any three primary colors to be not brighter than the D65 white point 405. By using a limited number of pre-determined primary colors (e.g., 10 primary colors), the system may only need a limited number of driving currents (e.g., 9 current intensities each being associated with particular PWM settings) for driving the CS-µLEDs-based displays.

It is notable that the 10 pre-determined primary colors are for example purpose and the number of the pre-determined primary colors is not limited thereto. For example, the system may have any suitable number of pre-determined primary colors (e.g., 10, 15, 20, or any integer) for displaying images. Each of the pre-determined primary color may have a particular brightness level that will be determined using methods and process as described in later sections of this disclosure. The system may use these pre-determined primary colors to create a variety of colors forming a three-dimensional color gamut for the display in a three-dimensional color space, as will be described in later sections of this disclosure. In this disclosure, the "primary colors" may refer to the colors that may be used in combination with one or more other "primary colors" to generate different colors. It is notable that the "primary colors" are not limited to red, green, and blue colors but can be any suitable colors (e.g., along the color shifting curve) that can be produced by the CS-µLEDs.

Figure 5A:
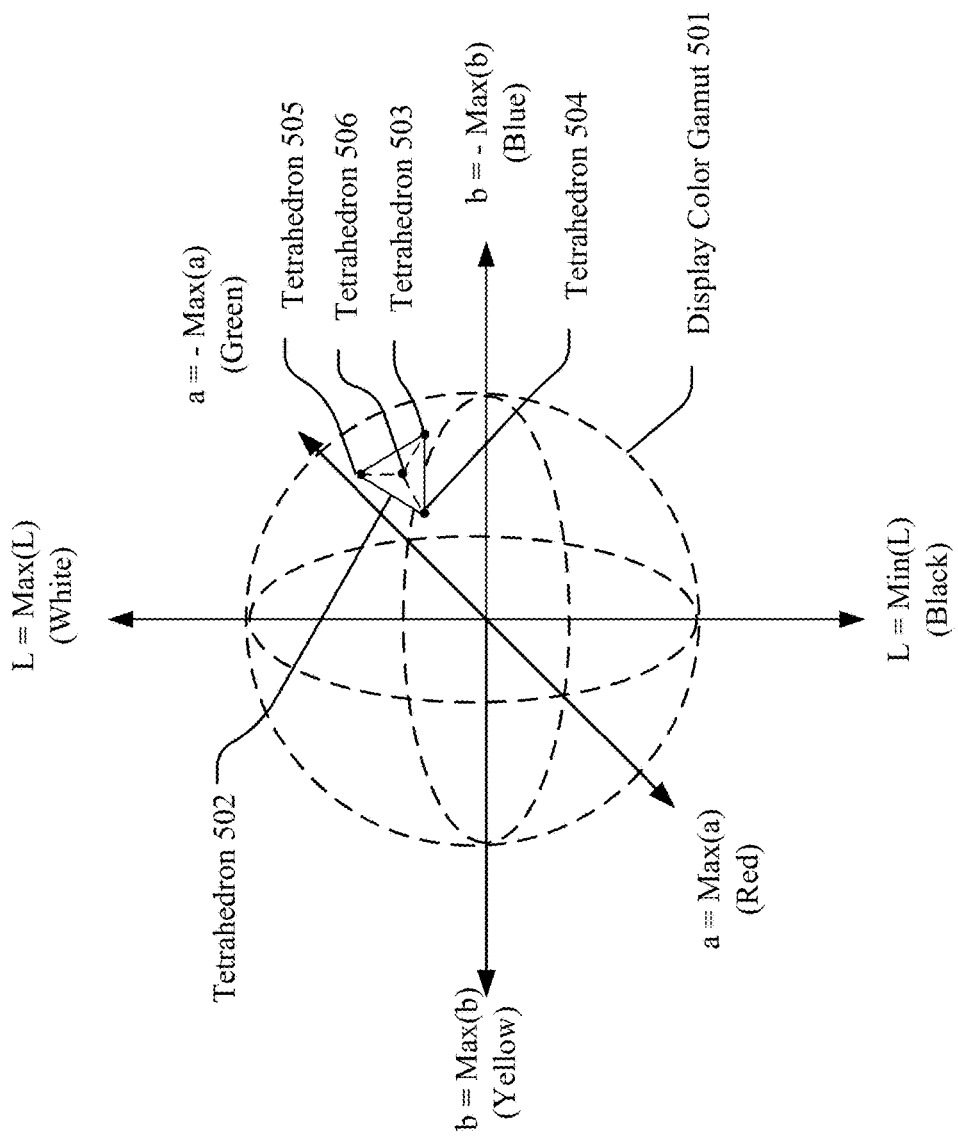
FIG. 5A illustrates an example three-dimensional color space that can be used for displaying images on color-shifting μLEDs-based displays.

FIG. 5A illustrates an example three-dimensional color space 500A that can be used for displaying images on CS-µLEDs-based displays. In particular embodiments, the system may use a Lab color space (i.e., CIELAB color space or L*a*b color space) for determining the three-dimensional color gamut for the CS-µLEDs-based display. In the Lab color space, a color may be represented by three values of L, a, and b, where L is for brightness level (or luminance) from black (corresponding to Min(L)) to white (corresponding to Max(L)); a and b are chromaticity coordinates with a corresponding colors from green (corresponding to −Max (a)) to red (corresponding to +Max(a)), and h corresponding to colors from blue (corresponding to −Max(b)) to yellow (corresponding to +Max(b)). In particular embodiments, the system may select a limited number of pre-determined primary colors (e.g., 10 primary colors) and use the combination of two or more of these primary colors to create a limited number of colors (e.g., 130 colors) that form a three-dimensional color gamut for the CS-µLEDs-based display within a three-dimensional color space. As an example and not by way of limitation, the AR/VR system may include three display panels each having an array of CS-µLEDs. Each pixel location corresponding to an image pixel may be associated with three CS-µLEDs from the three display panels, respectively.

In particular embodiments, the system may pre-determine, for the CS-µLEDs of the three display panels, 10 primary colors including 9 colors that are selected along the color shifting curve and the back color corresponding to a turn-off status of CS-µLEDs. Each CS-µLED of each display panel could be controlled by the system to emit light with any colors selected from these 10 primary colors with particular luminance values. As a result, the three CS-µLEDs that are associated with a same pixel location could produce 130 pre-determined colors of particular brightness levels corresponding to the 130 possible combinations of the primary colors (e.g., combinations of selecting 3 from 10 and plus 10). These 130 pre-determined colors may each correspond to a location within the three-dimensional color space (e.g., the Lab color space 500A) and form a three-dimensional color gamut (e.g., 501) for the display. It is notable that the three-dimensional color gamut 501 is represented by a sphere shape in FIG. 5A for explanation purpose. The actual three-dimensional color gamut may have a convex hull that is not a sphere shape. Instead, the hull the three-dimensional color gamut may be a polyhedron as determined by the locations of the 130 pre-determined colors within the three-dimensional color space 500A. It is notable that the 130 pre-determined colors that form the three-dimensional color gamut are for example purpose and the color gamut that can be used for CS-µLEDs-based displays are not limited thereto. For example, the color gamut that can be used for CS-µLEDs-based displays may be formed by any suitable number of pre-determined colors (e.g., 130 colors for display systems with three display panels, 55 colors for display systems with two display panels).

In particular embodiments, the three-dimensional color gamut corresponding to the pre-determined colors (e.g., 130 colors or 55 colors) in the three-dimensional color space may be tetrahedralized into M number of tetrahedrons. In particular embodiments, the system may determine the locations for all the pre-determined colors (e.g., 130 colors) in the three-dimensional color space. These locations may form a point of cloud pattern in the three-dimensional color space and may be tetrahedralized using a tetrahedralization algorithm. As described in earlier sections of this disclosure, each pre-determined color included in the three-dimensional color gamut may be associated with two chromaticity coordinates a and b and a luminance value L indicating the brightness level of that pre-determined color. The luminance values of the pre-determined colors forming the three-dimensional color gamut may be determined with a constraint condition that allows the tetrahedrons of the three-dimensional color gamut to have as uniform volumes as possible. In other words, the luminance values and the chromaticity coordinates of the pre-determined colors (e.g., 130 colors) may be determined with constraint conditions that allow the tetrahedron mesh of the display color gamut in the Lab space to have as even a distribution of tetrahedron volumes as possible. As a result, the M number of tetrahedrons may have roughly the same volume to each other. After the display color gamut 501 being tetrahedralized, each pre-determined color (e.g., of the 130 pre-determined colors) may be associated with a vertex of a corresponding tetrahedron. The four vertices of each tetrahedron (e.g., 502) in the display color gamut 501 may be associated with four pre-determined colors (e.g., 503, 504, 505, 506) included in the display color gamut 501.

In particular embodiments, to display an image on a CS-µLEDs-based display, the system may map pixel colors that are defined in convention color spaces (e.g., a tristimulus space, an sRGB color space, an HSV color space, an HSL, color space, a CMYK color space, etc.) to the display color gamut as defined by the combinations of the N number of pre-determined colors with corresponding luminance values in the three-dimensional color space. Then, for each pixel location, the system may identify a pre-determined color from the N number of pre-determined colors that define the display color gamut as an approximation to the desired color with the desired luminance value. After that, the system may determine the three primary colors that correspond to the pre-determined color identified from the N number of pre-determine colors defining the display color gamut. Then, the system may control three CS-μLEDs of the respective display panels that are associated with that particular pixel location to produce three primary colors with pre-determined luminance values that are controlled by setting the PWM value. These three primary colors with particular luminance values, in combination, may produce the identified pre-determined color that may be used as an approximation of the desired color with the desired brightness level. In the meantime, the system may propagate errors of the pixel colors using Floyd-Steinberg dithering.

Figure 5B:
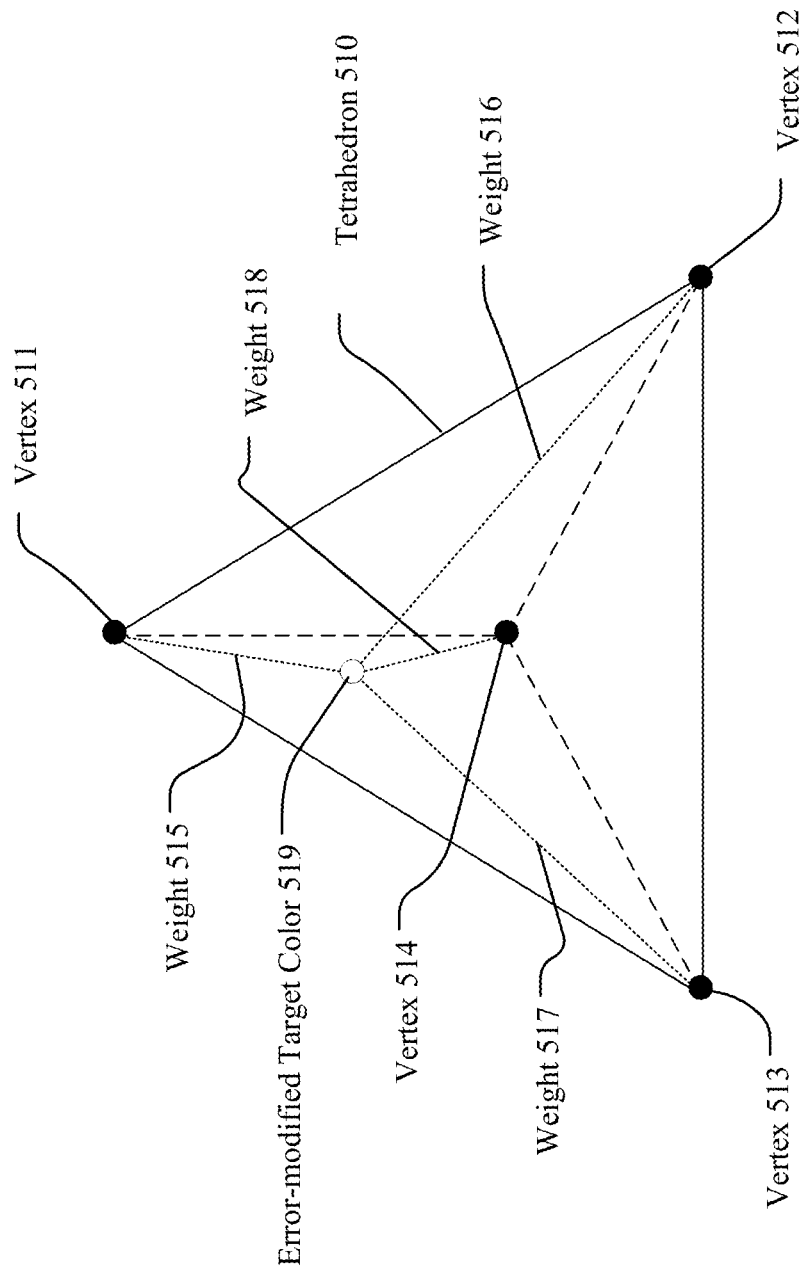
FIG. 5B illustrates an example process for determining dithered color based on an associated tetrahedron.

FIG. 5B illustrates an example process 500B for determining dithered color based on an associated tetrahedron. In particular embodiments, to restrict the magnitude of the propagated error, the system may decompose the display gamut volume into a number of tetrahedrons and choose the dithered color according to the tetrahedron that encloses the desired color's location within the display color gamut (e.g., the location of an error-modified target color). As described in earlier sections of this disclosure, the luminance values of the primary colors may be selected with a constraint condition that allows the tetrahedrons of the display color gamut to have as uniform volumes as possible in the three-dimensional color space. The tetrahedrons with uniform volumes may allow the dithering error (i.e. dithering noise) to be as uniform as possible across all colors, and therefore create a better visual effect for the displayed images. As an example and not by way of limitation, to display an image pixel at a pixel location of (x, y), the system may determine or receive a target pixel color $I_{(x, y)}$ and a propagated error $e_{(x, y)}$ for that pixel location (x, y). The propagated error $e_{(x, y)}$ may be determined using a Floyd-Steinberg dithering algorithm when processing the preceding pixels. Then, the system may determine the error-modified target color $u_{(x, y)}$ using the following equation:

$$u_{(x,y)} = I_{(x,y)} + e_{(x,y)} \quad (1)$$

Then, the system may determine a location 519 in the three-dimensional color space for the error-modified target color $u_{(x, y)}$ based on its chromaticity coordinates and the target luminance value L. Then, the system may check if the location 519 of the error-modified target color $u_{(x, y)}$ falls within the convex hull of the display color gamut. When the location 519 of the error-modified target color $u_{(x, y)}$ does fall within the convex hull of the display color gamut, the system may identify a tetrahedron 510 from the M number of tetrahedrons of the display color gamut based on a determination that that tetrahedron 510 inclusively contains or encloses the location 519 of the error-modified target color $u_{(x, y)}$. In particular embodiments, the error-modified target color may be kept within the display color gamut (e.g., by projecting back to the display gamut as described in later sections of this disclosure) to keep the Floyd-Steinberg dithering from becoming unstable.

After that, in particular embodiments, the system may determine the barycentric weights (e.g., 515, 516, 517, 518) of the error-modified target color 519 with respect to the four vertices (e.g., 511, 512, 513, 514) of the associated tetrahedron 510. Then, the system may compare the four barycentric weights (e.g., 515, 516, 517, 518) of the error-modified target color 519 and identify the vertex (e.g., 511) that is associated with the maximum barycentric weight (e.g., 515) among the four barycentric weights (e.g., 515, 516, 517, 518). Then, the system may select the vertex (e.g., 511), from the four vertices of the tetrahedron, which is the closest vertex to the error-modified target color 519 based on a determination that the vertex (e.g., 511) is associated with the maximum barycentric weight 515. The system may use the pre-determined color (which is one of the N number of pre-determined colors defining the display color gamut) that corresponds to the selected vertex 515, as the dithered pixel color $u_{(x, y)}$ for the pixel location (x, y). After that, the system may determine the three primary colors that in combination produce the pre-determined color corresponding to the selected vertex (e.g., 511). As an example and not by way of limitation, the correlations between the N pre-determined colors and their corresponding primary colors may be stored in a lookup table which can be accessed during run time by the system. The system may access the lookup table to determine the three primary colors that are associated with the dithered pixel color $I'_{(x, y)}$ for the pixel location (x, y). The system may determine the current densities and corresponding PWM setting parameters that are needed to drive three CS-μLEDs of respective display panels that are associated with the current pixel location (x, y). Then, the system may output the driving signals with the appropriate current densities and PWM setting parameters to corresponding CS-μLEDs to produce the three primary colors. These three primary colors that, when observed in combination, may produce the dithered color $I'_{(x, y)}$ at the pixel location (x, y). After that, the system may calculate the error $e'_{(x, y)}$ of the current pixel color using the following equation and propagate the error $e'(x_y)$ to other neighboring pixels using Floyd-Steinberg dithering:

$$e'_{(x,y)} = u_{(x,y)} - I'_{(x,y)} \quad (2)$$

In particular embodiments, the target color $I_{(x, y)}$, the propagated error $e_{(x, y)}$, the error-modified target color $u_{(x, y)}$, the dithered pixel color $I'_{(x, y)}$, and the dithering error $e'_{(x, y)}$ to other neighboring pixels may be defined and represented in a tristimulus color space. It is notable that the tetrahedron 510 in FIG. 5B is for example purpose. The tetrahedrons of the display color gamut are not limited thereto. For example, the tetrahedrons of the display color gamut may have any suitable shapes and any suitable sizes beside the shape and size as shown in FIG. 5B.

Figure 5C:
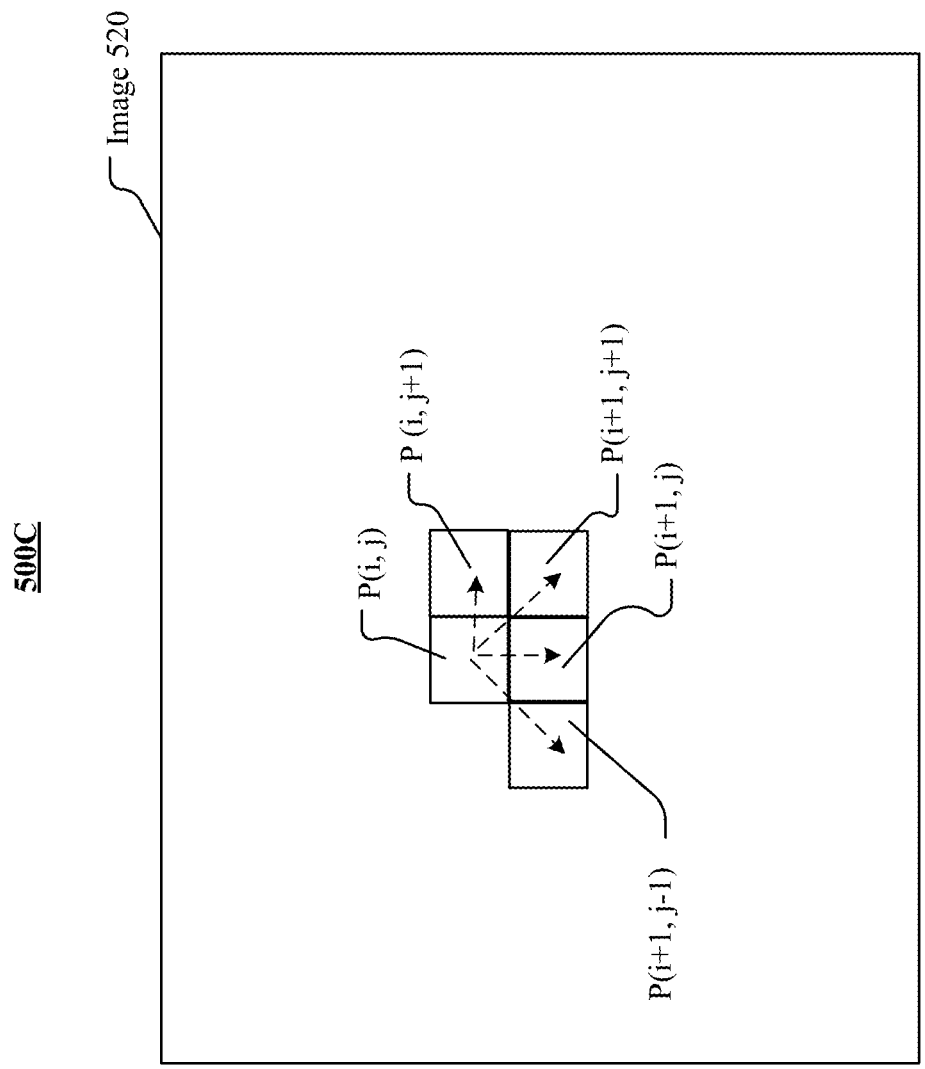
FIG. 5C illustrates an example process for propagating errors using Floyd-Steinberg dithering.

FIG. 5C illustrates an example process 500B for propagating errors using Floyd-Steinberg dithering. In particular embodiments, the system may propagate the pixel errors to neighboring pixel locations using the Floyd-Steinberg dithering. For a current pixel $P_{(i, j)}$ of the image 520, the system may first determine or receive a target color $I_{(i, j)}$ (e.g., as defined a tristimulus color space) and a propagated error $e_{(i, j)}$ (e.g., as defined a tristimulus color space) for the pixel $P_{(i, j)}$. The propagated error $e_{(i, j)}$ may be an error that is determined during the processes for processing proceeding pixels using the Floyd-Steinberg dithering. The system may use the methods and processes as described in earlier sections of this disclosure to determine a dithered color $I'_{(i, j)}$ for the current pixel $P_{(i, j)}$. Then, the system may use Equation (2) to determine the error $e'_{(i, j)}$ that needs to be propagated to neighboring pixel locations. After that, the system may use the Floyd-Steinberg model to split the error $e'_{(i,j)}$ into four portions and propagate these error portions to respective neighboring pixel locations. As an example and not by way of limitation, the system may feed the error portion $e'_{(i,j)}$ into the Floyd-Steinberg model and determine four error portions of $e_{(i,j+1)}$, $e_{(i+1,j-1)}$, $e_{(i+1,j)}$ and $e_{(i+1,j+1)}$ for the four adjacent or neighboring pixels of $P_{(i,j+1)}$, $P_{(i+1,j-1)}$, $P_{(i+1,j)}$, and $P_{(i+1,j+1)}$, respectively. The system may determine a first error portion $e_{(i,j+1)}$ corresponding to a first adjacent pixel $P_{(i,j+1)}$ which is the pixel in the same row and the next column to the current pixel. The first error portion value may be determined using $e'_{(i,j)} \times 7/16$. The system may determine a second error portion value $e_{(i+1,j-1)}$ corresponding to a second adjacent pixel which is the pixel in the next row and the last column to the current pixel. The second spatial error value may be determined using $e'_{(i,j)} \times 3/16$. The system may determine a third error portion value $e_{(i+1,j)}$ corresponding to a third adjacent pixel which is the pixel in the next row and the same column to the current pixel. The third error portion value may be determined using $e'_{(i,j)} \times 5/16$. The system may determine a fourth error portion value $e_{(i+1,j+1)}$ corresponding a fourth adjacent pixel which is the pixel in the next row and the next column to the current pixel. The fourth error portion value may be determined using $e'_{(i,j)} \times 1/16$. The four error portions may be propagated to the respective neighboring pixel locations and may be used for modifying the respective target color values when these neighboring pixels are processed.

Figure 5D:
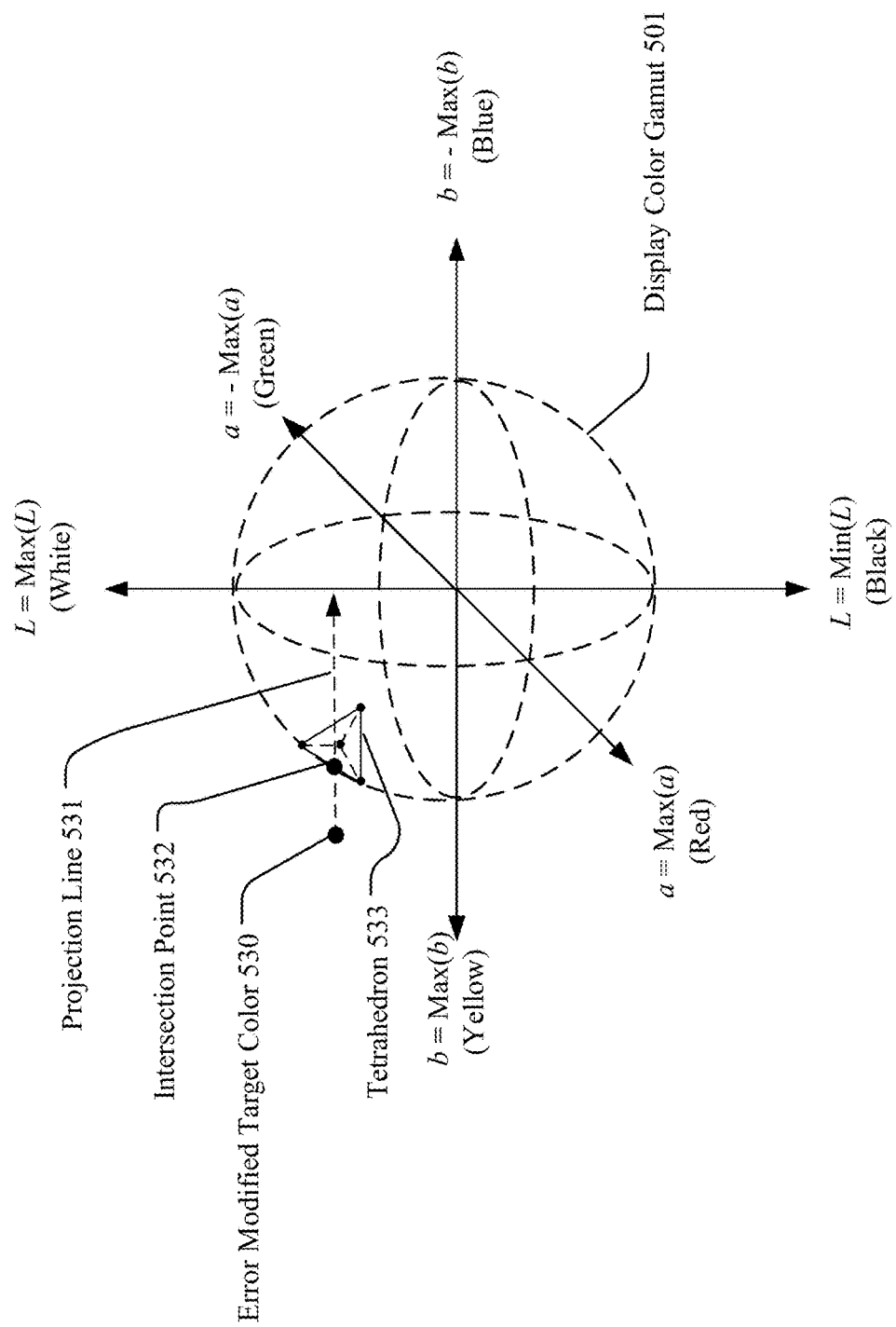
FIGS. 5D-5E illustrate example processes for projecting an error-modified target color that is outside of the display color gamut back to the display color gamut.
Figure 5E:
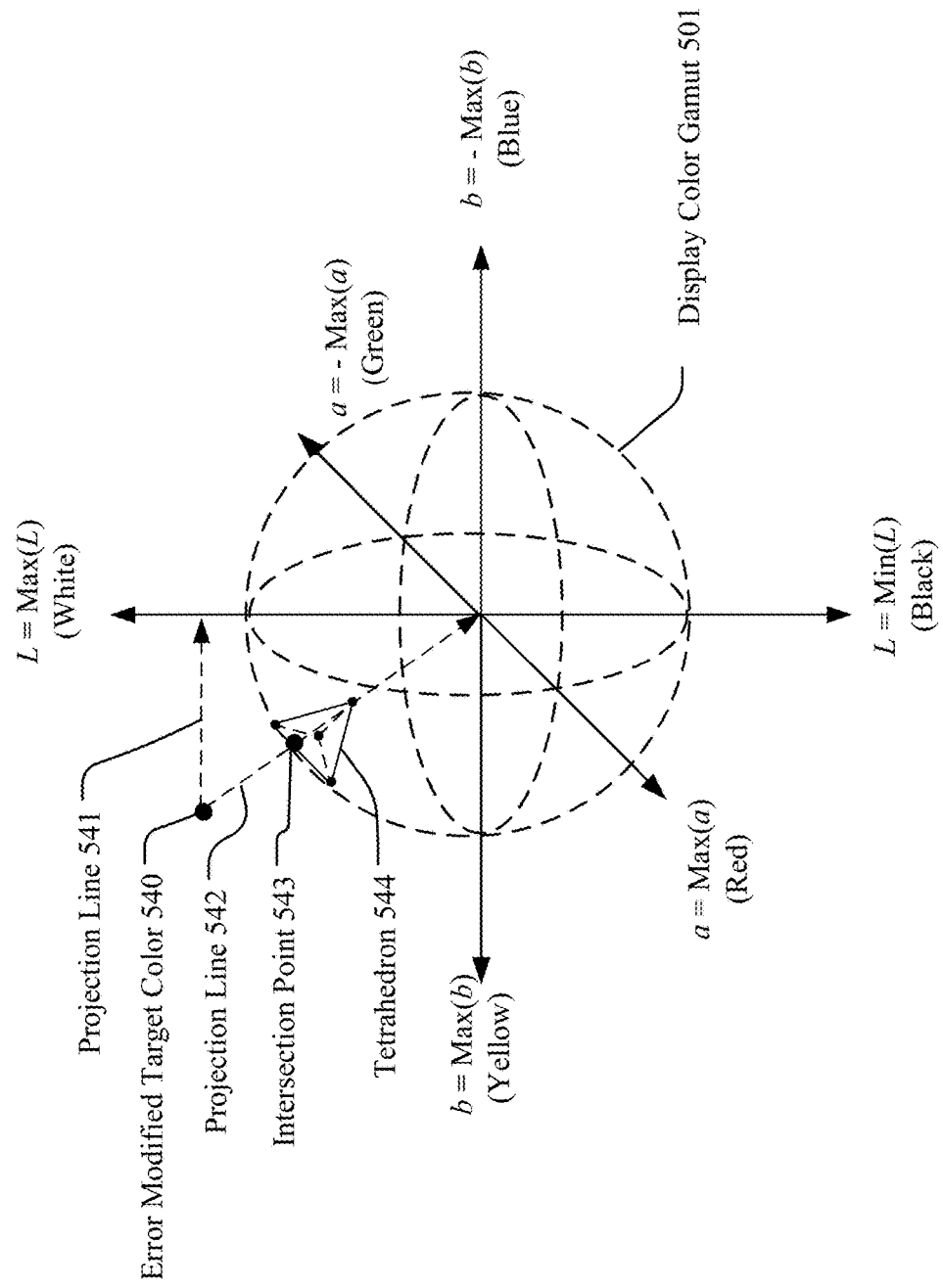

FIGS. 5D-5E illustrate example processes 500D and 500E for projecting an error-modified target color 530 that is outside of the display color gamut 501 back to the display color gamut 501. In particular embodiments, the error-modified target color 530 for a pixel location may be outside of the display color gamut 501. For example, for a particular pixel location, the target color as determined from the corresponding image pixel may be close to the edge of the display gamut convex hull. When the target color is modified by the propagated error from proceeding pixels, the error-modified target color may be outside of or beyond the convex hull of the display color gamut. As a result, the Floyd-Steinberg dithering algorithm may become unstable. To solve this problem, in particular embodiments, the system may use a multi-primary Floyd-Steinberg dithering algorithm to take into consideration the multi-primary three-dimensional color gamut 501 (e.g., with 10 primary colors and 130 color points).

As an example and not by way of limitation, when the error-modified target color 530 does not fall within the convex hull of the display color gamut 501, as shown in FIG. 5D, the system may determine the associated tetrahedron by projecting the error-modified target color 530 back to the display color gamut 501. The system may project the error-modified target color 530 along the projection line 531, which may start from the error-modified target color 530 pointing to a point on the luminance axis that has the same luminance value with the error-modified target color 530. When the projection line 531 intersects with the convex hull of the display color gamut 501, the system may determine the associated tetrahedron 533 based on the intersection point 532 of the projection line 531 and the convex hull of the display color gamut 501. Then, the system may identify the tetrahedron 533 from the display color gamut 510 based on a determination that the tetrahedron 533 inclusively contains or encloses the intersection point 532. After that, the system may determine the barycentric weights for the intersection point 532 with respect to the four vertices of the identified tetrahedron 533.

Then, the system may compare the four barycentric weight values with each other and identify the maximum barycentric weight value and the vertex associated with the maximum barycentric weight. The vertex associated with the maximum barycentric weight value may be the closest vertex to the intersection point 532 among the four vertices of the identified tetrahedron 533. Then, the system may identify the pre-determined color corresponding to the vertex associated with the maximum barycentric weight as the dithered color for the error-modified target color 530 for the current pixel location. Then, the system may determine the error between the dithered color and the error-modified target color 530 and propagate that error to neighboring pixels using the multi-primary Floyd-Steinberg dithering algorithm. In this scenario, by using the projection line 531 that is parallel to the a-b plane of the three-dimensional color space, the luminance value of the error-modified target color 530 may be preserved and the difference between the error-modified target color 530 and the dithered color may be limited to colors.

As another example and not by way of limitation, as shown in FIG. 5E, when the error-modified target color 540 does not fall within the convex hull of the display color gamut 501, the system may determine the associated tetrahedron 543 by projecting the error-modified target color 540 back to the display color gamut 501 using a projection line 542 which starts from the error-modified target color 540 and points to the center point of the display color gamut 501. The system may first try to project the error-modified target color 540 along the projection line 541, which may be in a direction starting from the error-modified target color 540 pointing to a point on the luminance axis that has the same luminance value with the error-modified target color 540. However, in this example, the projection line 541 does not intersect with the convex hull of the display color gamut 501. The system may project the error-modified target color 540 along the projection line 542 which starts from the error-modified target color 540 and points to the center point of the display color gamut 501. In particular embodiments, the system may project the error-modified target color 540 along a projection line which starts from the error-modified target color 540 and points to a point on the luminance axis corresponding to a center luminance value of the three-dimensional color gamut 501.

After that, the system may determine the associated tetrahedron 544 based on the intersection point 543 of the projection line 542 and the convex hull of the three-dimensional color gamut 501. The system may identify the tetrahedron 544 from a number of tetrahedrons of the display color gamut 510 based on a determination that the tetrahedron 544 inclusively contains or encloses the intersection point 543. Then, the system may determine the barycentric weights for the intersection point 543 with respect to the four vertices of the identified tetrahedron 544. After that, the system may compare the four barycentric weight values to each other and identify the maximum barycentric weight value and the vertex that is associated with the maximum barycentric weight. The vertex associated with the maximum barycentric weight may be the closest vertex to the intersection point 543 among the four vertices of the identified tetrahedron 544. Then, the system may identify the pre-determined color corresponding to the vertex associated with the maximum barycentric weight as the dithered color for the error-modified target color 540 for the current pixel location. Then, the system may determine the error between the dithered color and the error-modified target color 540 and propagate that error to neighboring pixels using the multi-primary Floyd-Steinberg dithering algorithm.

In particular embodiments, the methods, processes, and principles as described above for CS-µLEDs-based displays including three display panels may be applied for displaying images on CS-µLEDs-based displays that include two display panels or a signal display panel (instead of three display panels). In particular embodiments, the display system may include two display panels each including an array of CS-µLEDs. The system may produce each pre-determined color of N number of pre-determined colors (e.g., N=55) that define the display color gamut by combining two primary colors generated by two CS-µLEDs of the two display panels, respectively. For example, the system may generate white color by combining red and cyan or yellow and blue. In particular embodiments, the system may select 10 pre-determined primary colors for the CS-µLEDs of each display panel. As a result, the system may generate 55 pre-determined colors with certain luminance values based on the 55 possible combinations of the 10 primary colors. In particular embodiments, the 55 pre-determined colors with particular luminance values may form a three-dimensional color gamut for the CS-µLEDs-based display which includes two display panels. The three-dimensional color gamut of the display may be tetrahedralized into a number of tetrahedrons that can be used for determining the pixel color to be dithered using the same or similar methods for the CS-µLEDs-based display including three display panels.

In particular embodiments, the CS-µLEDs-based display may include a single display panel which includes an array of Cs-µLEDs. In this scenario, the system may instruct the display panel to work in a field sequential mode with a frame rate that is two or three times faster than the conventional frame rate used by the CS-µLEDs-based display including three display panels. The display system may display two or three primary colors with particular brightness sequentially in time and produce the desired color corresponding to the combination of these two or three sequentially displayed colors. The images may be rendered and displayed on the CS-µLEDs-based display including a single display panel using the same or similar methods, processes, and principles for the CS-µLEDs-based display with three display panels.

Figure 6:
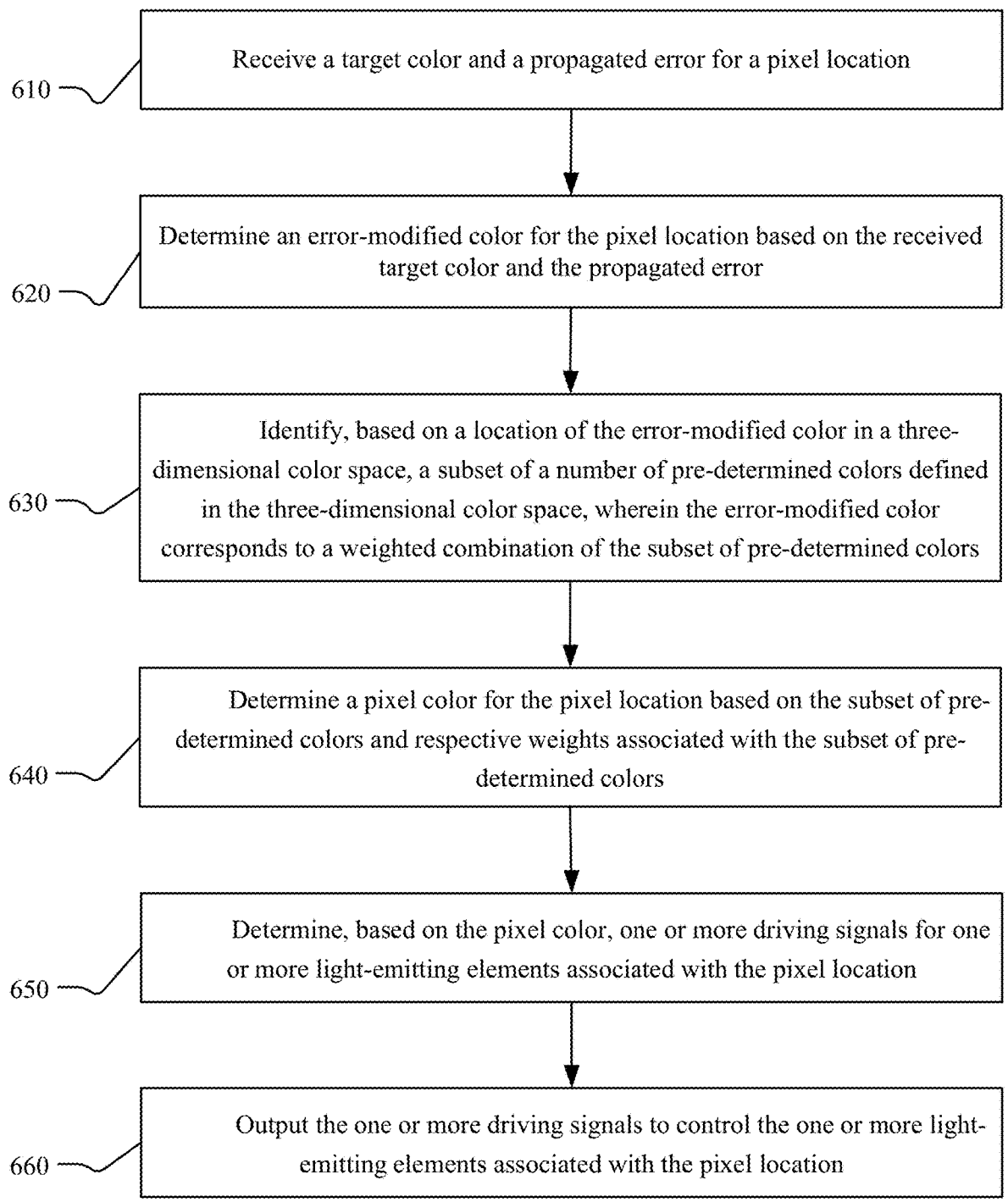
FIG. 6 illustrates an example method for displaying images using color-shifting μLEDs-based displays.

FIG. 6 illustrates an example method 600 for displaying images using color-shifting µLEDs-based displays. The method may begin at step 610, wherein a computing system may receive a target color and a propagated error for a pixel location. The target color and propagated error may be associated with an image to be displayed using the CS-µLEDs-based display. At step 610, the system may determine an error-modified target color for the pixel location based on the received target color and the propagated error. At step 620, the system may identify, based on a location of the error-modified target color in a three-dimensional color space, a subset of pre-determine colors from a number of pre-determined colors defined in the three-dimensional color space. The error-modified target color may correspond to a weighted combination of the subset of pre-determined colors. At step 630, the system may determine a pixel color for the pixel location based on the subset of pre-determined colors and respective weights associated with the subset of pre-determined colors. At step 640, the system may determine, based on the pixel color, one or more driving signals for one or more light-emitting elements associated with the pixel location. At step 650, the system may output the one or more driving signals to control the one or more light-emitting elements associated with the pixel location.

In particular embodiments, the subset pre-determined colors may each correspond to a vertex of a tetrahedron associated with the subset of pre-determined colors in the three-dimensional color space. In particular embodiments, the system may, in response to a determination that the location of the error-modified target color falls within a hull of a three-dimensional color gamut in the three-dimensional color space, identify the tetrahedron from a number of tetrahedrons associated with the three-dimensional color gamut based on a determination that the tetrahedron encloses the location of the error-modified target color. In particular embodiments, the system may, in response to a determination that the error-modified target color falls out of a hull of the three-dimensional color gamut, determine a first projection line starting from the location of the error-modified target color pointing to a point on a luminance axis having a same luminance value to the error-modified target color. The tetrahedron may be associated with a first intersection of the first projection line with the hull of the three-dimensional color gamut. In particular embodiments, the system may, in response to a determination that the first projection line does not intersect with the hull of the three-dimensional color gamut, determine a second projection line starting from the location of the error-modified target color pointing to a center luminance point of the three-dimensional gamut. The tetrahedron may be associated with a second intersection of the second projection line with the hull of the three-dimensional color gamut. In particular embodiments, the system may determine barycentric weights for the location of the error-modified target color with respect to the vertices of the tetrahedron. The pixel color may be determined based on a vertex associated with a maximum barycentric weight of the location of the error-modified target color. In particular embodiments, the pixel color for the pixel location may be a closest color to the error-modified target color among the pre-determined colors associated with the three-dimensional color gamut.

In particular embodiments, the system may determine a dithering error based on a difference between the target color and the pixel color. The system may prorogate the dithering error to neighboring pixels using a multi-primary Floyd-Steinberg dithering algorithm. The multi-primary Floyd-Steinberg dithering algorithm may have access to information related to the three-dimensional color gamut. In particular embodiments, the system may determine, based on a luminance parameter of the pixel color for the pixel location, one or more PWM setting parameters for the driving signals. The driving signals output to the one or more light-emitting elements may be configured using the one or more PWM setting parameters. In particular embodiments, the one or more light-emitting elements associated with the pixel location may emit light with the pixel color and a luminance value corresponding to the luminance parameter. The one or more light-emitting elements may operate in an ON/OFF mode as controlled by the driving signals configured using the one or more PWM setting parameters. In particular embodiments, the target color may be mapped into the three-dimensional color space as defined by the display from a color model defined in a tristimulus space, an RGB color space, an HSV color space, an HSL, color space, or a CMYK color space. In particular embodiments, the propagated error may be determined by a multi-primary Floyd-Steinberg dithering algorithm during a dithering process for processing preceding pixels.

In particular embodiments, each of the pre-determined colors may correspond to a combination of two or more pre-determined primary colors associated with the one or more light-emitting elements. The system may determine the two or more pre-determined primary colors based on the pixel color. Each of the two or more pre-determined primary colors may be associated with a pre-determined luminance value. In particular embodiments, the two or more pre-determined primary colors may be determined based on a color-shifting curve associated with the one or more light-emitting elements. In particular embodiments, the one or more light-emitting elements may emit light with different colors as characterized by the color-shifting curve when driven by signals with different current densities. In particular embodiments, each pre-determined primary color may be associated with a combination of a current density and one or more PWM setting parameters. In particular embodiments, the current density may control a color hue of that pre-determined primary color. The one or more PWM setting parameters may control a brightness level or luminance value of that pre-determined primary color.

In particular embodiments, the one or more light emitting-elements may include three light-emitting elements associated with three display panels, respectively. Each of the pre-determined colors may correspond to a combination of three pre-determined primary colors generated by the three light-emitting elements of the three display panels, respectively. In particular embodiments, the one or more light emitting-elements may include two light-emitting elements associated with two display panels, respectively. Each of the pre-determined colors may be associated with a combination of two pre-determined primary colors generated by the two light-emitting elements of the two display panels, respectively. In particular embodiments, the one or more light emitting-elements may include a single light-emitting element associated with a single display panel. The single light-emitting element may emit light with two or more pre-determined primary colors sequentially in time. Each pre-determined color may correspond to a combination of the two or more pre-determined primary colors sequentially produced in time.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for displaying images using color-shifting μLEDs-based displays including the particular steps of the method of FIG. 6, this disclosure contemplates any suitable method for displaying images using color-shifting μLEDs-based displays including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
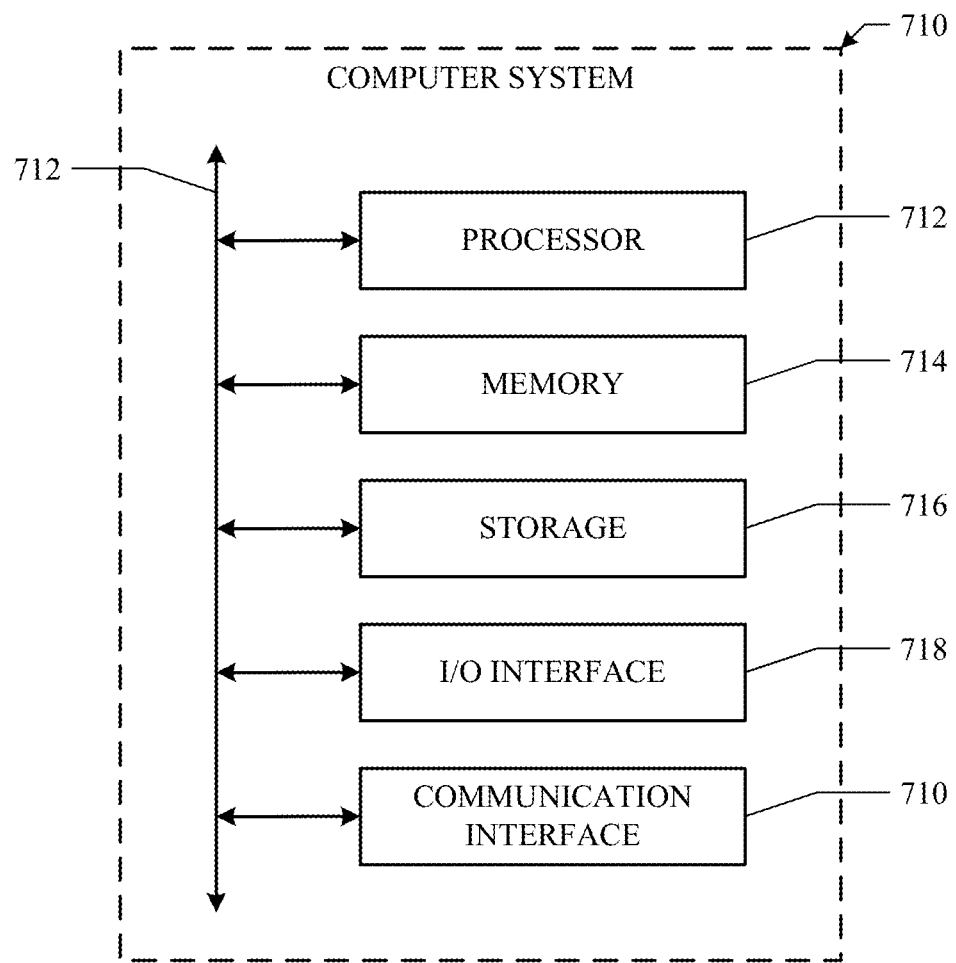
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   receiving a target color and a propagated error for a pixel location;
   determining an error-modified target color for the pixel location based on the received target color and the propagated error;
   identifying, based on a location of the error-modified target color in a three-dimensional color space, a subset of a plurality of pre-determined colors defined in the three-dimensional color space, wherein the error-modified target color corresponds to a weighted combination of the subset of pre-determined colors;
   determining a pixel color for the pixel location based on the subset of pre-determined colors and respective weights associated with the subset of pre-determined colors;
   determining, based on the pixel color, a driving signal having a current density for a light-emitting element associated with the pixel location; and
   outputting the driving signal to control the light-emitting element associated with the pixel location, wherein the light-emitting element emits light with a variable color hue depending on the current density.

2. The method of claim 1, wherein the subset of pre-determined colors each corresponds to a vertex of a tetrahedron associated with the subset of pre-determined colors in the three-dimensional color space.

3. The method of claim 2, further comprising:
   in response to a determination that the location of the error-modified target color falls within a hull of a three-dimensional color gamut in the three-dimensional color space, identifying the tetrahedron from a plurality of tetrahedrons associated with the three-dimensional color gamut based on a determination that the tetrahedron encloses the location of the error-modified target color.

4. The method of claim 2, further comprising:
   in response to a determination that the error-modified target color falls out of a hull of a three-dimensional color gamut, determining a first projection line starting from the location of the error-modified target color pointing to a point on a luminance axis having a same luminance value to the error-modified target color, wherein the tetrahedron is associated with a first intersection of the first projection line with the hull of the three-dimensional color gamut; and
   in response to a determination that the first projection line does not intersect with the hull of the three-dimensional color gamut, determining a second projection line starting from the location of the error-modified target color pointing to a center luminance point of the three-dimensional color gamut, wherein the tetrahedron is associated with a second intersection of the second projection line with the hull of the three-dimensional color gamut.

5. The method of claim 2, further comprising:
   determining barycentric weights for the location of the error-modified target color with respect to the vertices of the tetrahedron, and wherein the pixel color is determined based on a vertex associated with a maximum barycentric weight of the location of the error-modified target color.

6. The method of claim 5, wherein the pixel color for the pixel location is a closest color to the error-modified target color among the plurality of pre-determined colors associated with a three-dimensional color gamut.

7. The method of claim 1, further comprising:
   determining a dithering error based on a difference between the error-modified target color and the pixel color; and
   prorogating the dithering error to neighboring pixels using a multi-primary Floyd-Steinberg dithering algorithm, wherein the multi-primary Floyd-Steinberg dithering algorithm has access to information related to a three-dimensional color gamut.

8. The method of claim 1, wherein the driving signal is a PWM signal configured based on one or more PWM setting parameters, and wherein the one or more PWM setting parameters are determined based on a luminance value associated with the pixel color for the pixel location.

9. The method of claim 8, wherein the light-emitting element associated with the pixel location emits light corresponding to the pixel color and the luminance value, and wherein the light-emitting element operates in an ON/OFF mode as controlled by the driving signal configured using the one or more PWM setting parameters.

10. The method of claim 1, wherein the three-dimensional color space is a L*a*b color space, wherein the target color is mapped into the L*a*b color space from a color model defined in a tristimulus color space, an RGB color space, an HSV color space, an HSL color space, or a CMYK color space, and wherein the propagated error is determined by a multi-primary Floyd-Steinberg dithering algorithm during a dithering process for processing preceding pixels.

11. The method of claim 1, wherein each of the plurality of pre-determined colors corresponds to a combination of two or more pre-determined primary colors associated with the light-emitting element, further comprising:
determining the two or more pre-determined primary colors based on the pixel color, wherein each of the two or more pre-determined primary colors is associated with a pre-determined luminance value.

12. The method of claim 11, wherein the two or more pre-determined primary colors are determined based on a color-shifting curve associated with the light-emitting element.

13. The method of claim 12, wherein the light-emitting element emits light with different colors as characterized by the color-shifting curve when driven by driving signals with different current densities.

14. The method of claim 11, wherein each pre-determined primary color is associated with a combination of a current density and one or more PWM setting parameters for that pre-determined primary color.

15. The method of claim 14, wherein the current density for that pre-determined primary color controls a color hue of that pre-determined primary color, and wherein the one or more PWM setting parameters for that pre-determined primary color control a brightness level of that pre-determined primary color.

16. The method of claim 1, wherein each of the plurality of pre-determined colors corresponds to a combination of three pre-determined primary colors generated by light emitted by three light-emitting elements of three display panels, respectively.

17. The method of claim 1, wherein each of the plurality of pre-determined colors is associated with a combination of two pre-determined primary colors generated by light emitted by two light-emitting elements of two display panels, respectively.

18. The method of claim 1, wherein the light-emitting element emits light with two or more pre-determined primary colors sequentially in time, and wherein each of the plurality of pre-determined colors in the three-dimensional color space corresponds to a combination of the two or more pre-determined primary colors sequentially produced in time.

19. One or more computer-readable non-transitory storage media embodying software that is operable when executed by a computing device to:
receive a target color and a propagated error for a pixel location;
determine an error-modified target color for the pixel location based on the received target color and the propagated error;
identify, based on a location of the error-modified target color in a three-dimensional color space, a subset of a plurality of pre-determined colors defined in the three-dimensional color space, wherein the error-modified target color corresponds to a weighted combination of the subset of pre-determined colors;
determine a pixel color for the pixel location based on the subset of pre-determined colors and respective weights associated with the subset of pre-determined colors;
determine, based on the pixel color, a driving signal having a current density for a light-emitting element associated with the pixel location; and
output the driving signal to control the light-emitting element associated with the pixel location, wherein the light-emitting element emits light with a variable color hue depending on the current density.

20. A system comprising: one or more processors; and a memory coupled to the processors comprising instructions executable by the processors, the processors being operable when executing the instructions to:
receive a target color and a propagated error for a pixel location;
determine an error-modified target color for the pixel location based on the received target color and the propagated error;
identify, based on a location of the error-modified target color in a three-dimensional color space, a subset of a plurality of pre-determined colors defined in the three-dimensional color space, wherein the error-modified target color corresponds to a weighted combination of the subset of pre-determined colors;
determine a pixel color for the pixel location based on the subset of pre-determined colors and respective weights associated with the subset of pre-determined colors;
determine, based on the pixel color, a driving signal having a current density for a light-emitting element associated with the pixel location; and
output the driving signal to control the light-emitting element associated with the pixel location, wherein the light-emitting element emits light with a variable color hue depending on the current density.

* * * * *